US010724310B2

(12) United States Patent
McIver et al.

(10) Patent No.: US 10,724,310 B2
(45) Date of Patent: Jul. 28, 2020

(54) INTEGRATED PIPE HANDLING SYSTEM FOR WELL COMPLETION AND PRODUCTION

(71) Applicants: Terry L. McIver, Santa Anna, TX (US); Zachary C. Nash, Mason, TX (US); Gary R. Weatherman, Brady, TX (US)

(72) Inventors: Terry L. McIver, Santa Anna, TX (US); Zachary C. Nash, Mason, TX (US); Gary R. Weatherman, Brady, TX (US)

(73) Assignee: Glider Products LLC, Brady, TX (US)

( * ) Notice: Subject to any disclaimer, the term of this patent is extended or adjusted under 35 U.S.C. 154(b) by 0 days.

(21) Appl. No.: 16/003,240

(22) Filed: Jun. 8, 2018

(65) Prior Publication Data
US 2019/0376352 A1    Dec. 12, 2019

(51) Int. Cl.
| | |
|---|---|
| *B66F 7/10* | (2006.01) |
| *B66F 7/06* | (2006.01) |
| *B65G 1/06* | (2006.01) |
| *E21B 19/14* | (2006.01) |

(Continued)

(52) U.S. Cl.
CPC ............ *E21B 19/14* (2013.01); *B65G 1/0442* (2013.01); *B65G 1/06* (2013.01); *E21B 19/15* (2013.01)

(58) Field of Classification Search
CPC ........ E21B 19/15; E21B 19/155; E21B 19/14; B65D 88/123
See application file for complete search history.

(56) References Cited

U.S. PATENT DOCUMENTS

| | | | |
|---|---|---|---|
| 3,865,256 A | 2/1975 | Freeman, Sr. | |
| 4,202,653 A | 5/1980 | Moller | |
| 4,547,109 A | 10/1985 | Young et al. | |

(Continued)

FOREIGN PATENT DOCUMENTS

| | | | | |
|---|---|---|---|---|
| CA | 1170220 A | * | 7/1984 | ........... B65D 88/123 |
| GB | 2139269 | | 11/1984 | |
| WO | WO-84/01599 A1 | | 4/1984 | |

OTHER PUBLICATIONS

Form PCT/IBA/206 Invitation to Pay Additional Fees dated Aug. 23, 2019, issued in PCT/US2019/034957.

(Continued)

*Primary Examiner* — Gregory W Adams
(74) *Attorney, Agent, or Firm* — Covington & Burling LLP

(57) ABSTRACT

A novel integrated pipe handling system and method is provided wherein one or more pipe tubs having lift arms can be loaded with pipe and transported to a drill site where it may be deployed next to a pipe handling trailer. The pipe tubs and pipe handling trailer are arranged such that when the lift arms are raised, pipes may roll from a tub to the trailer, where a pipe is transferred to an angularly adjustable trough on the trailer. The trough may be raised to a preselected position and the pipe moved along the trough by a skate such that the pipe is available to be transferred from the pipe handling trailer to a drilling rig. The process may be reversed to remove pipe from the drilling rig. A control system, which may be operated in a manual or automated mode, is used to operate the integrated system using information about each pipe joint recorded during the loading process.

17 Claims, 35 Drawing Sheets

(51) Int. Cl.
*E21B 19/15* (2006.01)
*B65G 1/04* (2006.01)

(56) References Cited

U.S. PATENT DOCUMENTS

| | | | |
|---|---|---|---|
| 4,646,855 A | 3/1987 | Dellinger | |
| 4,850,439 A | 7/1989 | Lund | |
| 5,202,680 A | 4/1993 | Savage | |
| 5,259,723 A * | 11/1993 | Willis | B65G 47/8815 198/463.6 |
| 6,705,414 B2 | 3/2004 | Simpson et al. | |
| 6,926,488 B1 | 8/2005 | Bolding et al. | |
| 6,966,106 B1 | 11/2005 | Roodenburg et al. | |
| 6,976,540 B2 | 12/2005 | Berry | |
| 7,172,038 B2 | 2/2007 | Terry et al. | |
| 7,473,065 B2 * | 1/2009 | Wells | E21B 19/155 414/22.57 |
| 7,568,533 B2 | 8/2009 | Felt | |
| 7,726,418 B2 | 6/2010 | Ayling | |
| 8,167,117 B2 * | 5/2012 | Nieminen | B65G 1/08 198/530 |
| 8,186,455 B2 | 5/2012 | Childers et al. | |
| 8,378,841 B2 * | 2/2013 | Stevens | G06Q 10/08 166/250.01 |
| 8,801,356 B2 | 8/2014 | Gerber | |
| 8,985,928 B2 * | 3/2015 | Mark | B23P 11/00 414/22.55 |
| 9,353,582 B2 * | 5/2016 | De Mul | E21B 19/15 |
| 9,388,647 B2 | 7/2016 | Dahmes et al. | |
| 9,518,432 B2 | 12/2016 | Miranda et al. | |
| 2003/0196791 A1 | 10/2003 | Dunn et al. | |
| 2006/0151215 A1 | 7/2006 | Skogerbo | |
| 2007/0240884 A1 | 10/2007 | Fehres et al. | |
| 2008/0164064 A1 | 7/2008 | Belik et al. | |
| 2009/0053013 A1 | 2/2009 | Maltby | |
| 2009/0263221 A1 | 10/2009 | Oldershaw | |
| 2010/0096187 A1 | 4/2010 | Storm, Jr. et al. | |
| 2010/0150685 A1 * | 6/2010 | Sawyer | E21B 19/14 414/22.62 |
| 2012/0118639 A1 | 5/2012 | Gerber | |
| 2013/0343837 A1 | 12/2013 | Flusche | |
| 2014/0140791 A1 * | 5/2014 | Yorga | E21B 19/14 414/22.59 |
| 2015/0016925 A1 | 1/2015 | Larkin | |
| 2015/0308252 A1 * | 10/2015 | Grinrod | E21B 44/00 700/275 |
| 2016/0019494 A1 * | 1/2016 | Millett | G06Q 10/087 235/385 |
| 2016/0042310 A1 * | 2/2016 | Yanez Mendez | G06Q 10/087 705/28 |
| 2016/0342916 A1 * | 11/2016 | Arceneaux | G06Q 10/06313 |
| 2017/0030181 A1 * | 2/2017 | Thomas | E21B 44/04 |

OTHER PUBLICATIONS

Annex to PCT/IBA/206, Partial International Search Report dated Aug. 23, 2019, issued in PCT/US2019/034957.
Information on Search Strategy issued in PCT/US2019/034957.
Provisional Opinion on Patentability issued in PCT/US2019/034957.
Little Tripper™ Data Sheet, Forum Energy Technologies (Jan. 2018).

* cited by examiner

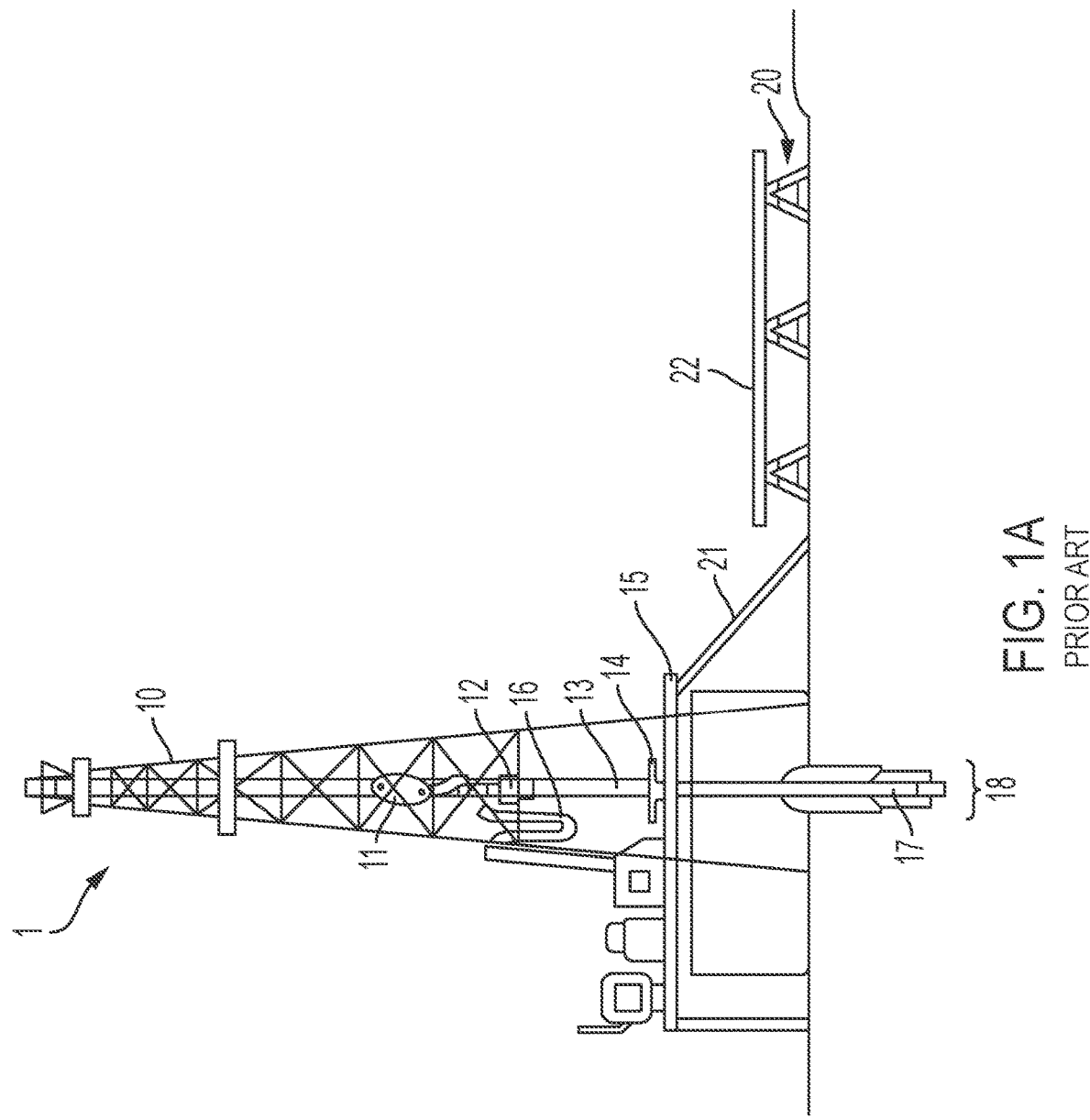

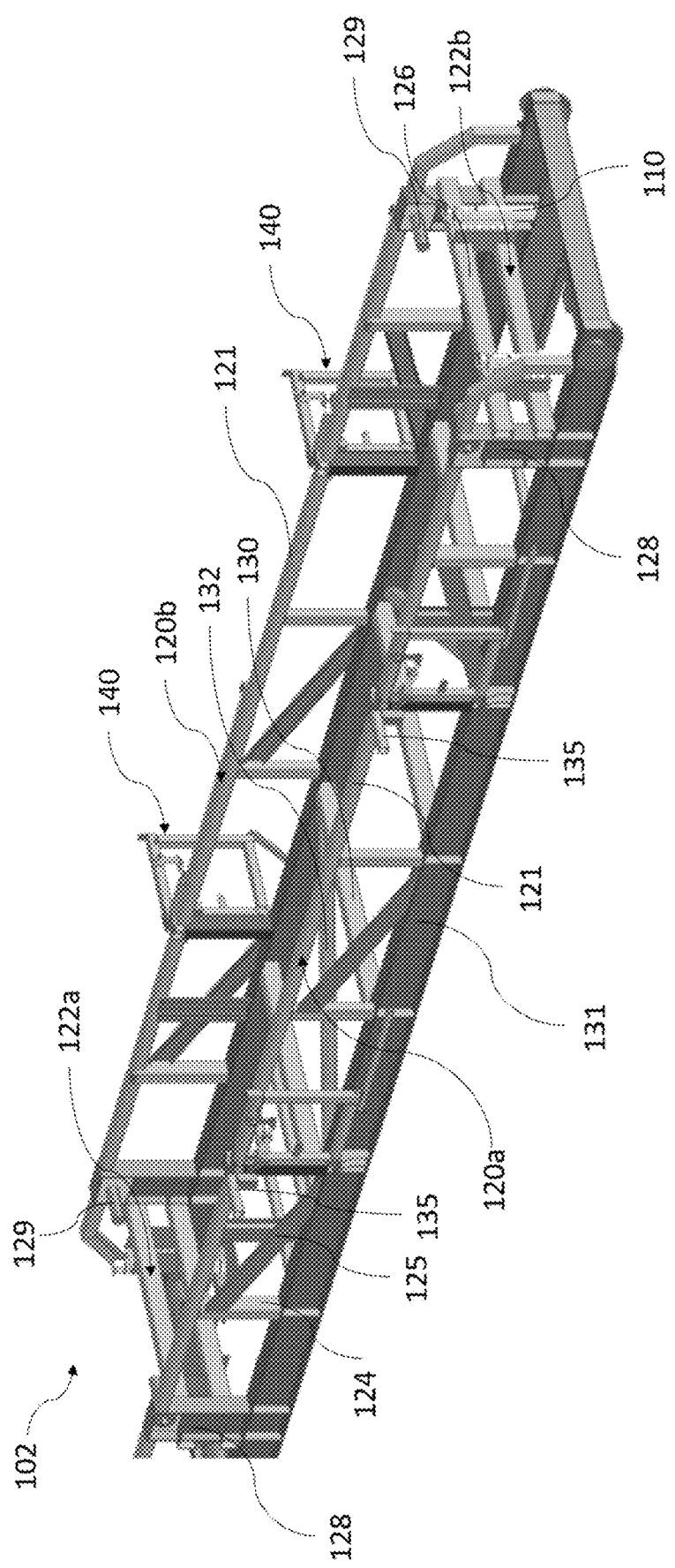

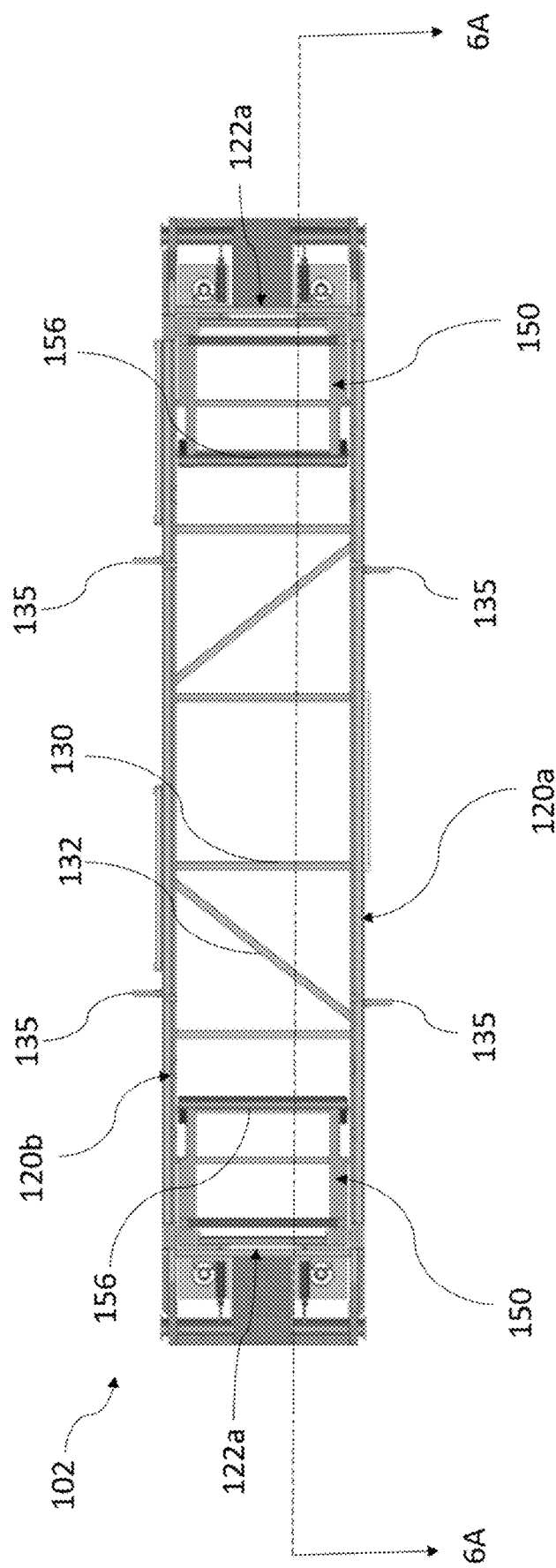

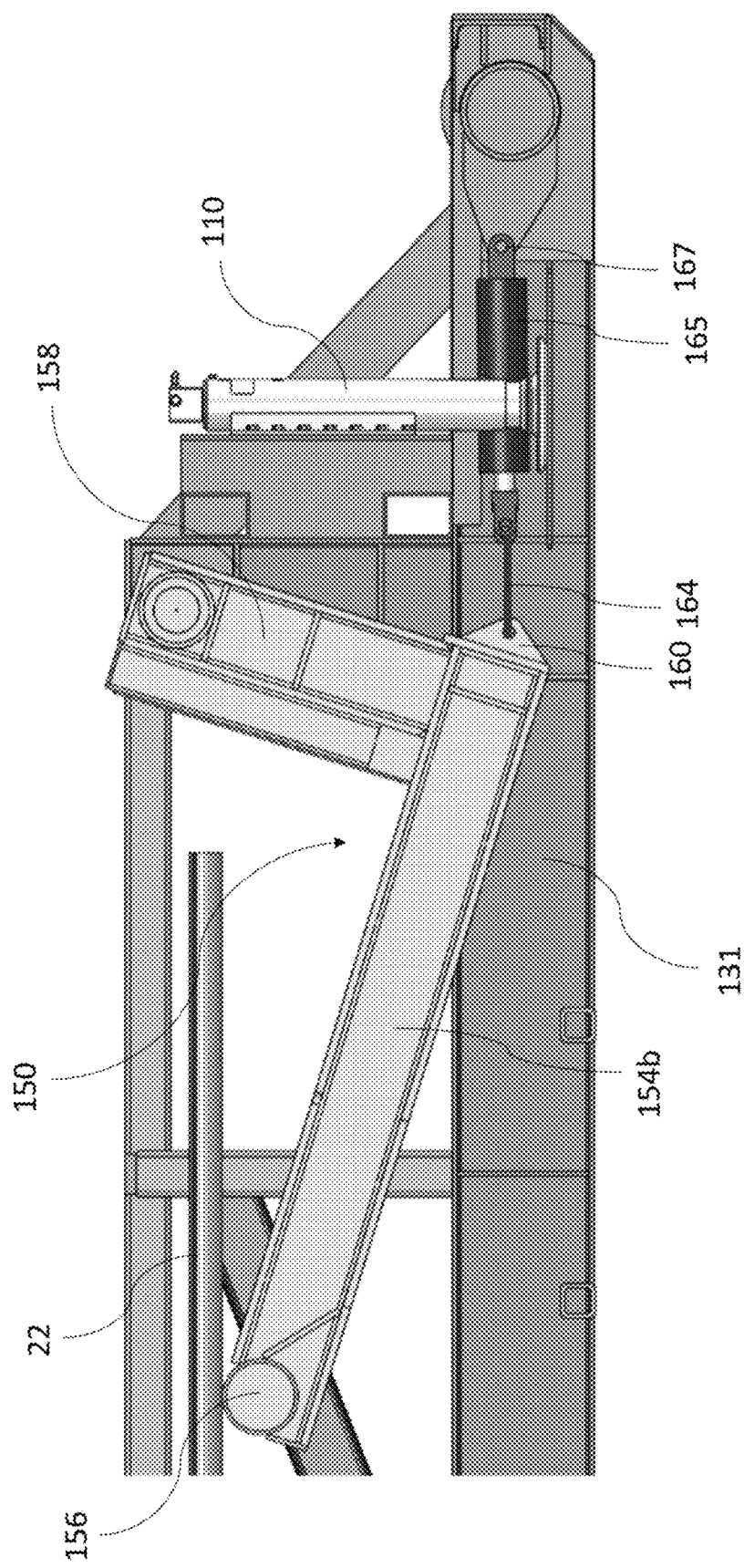

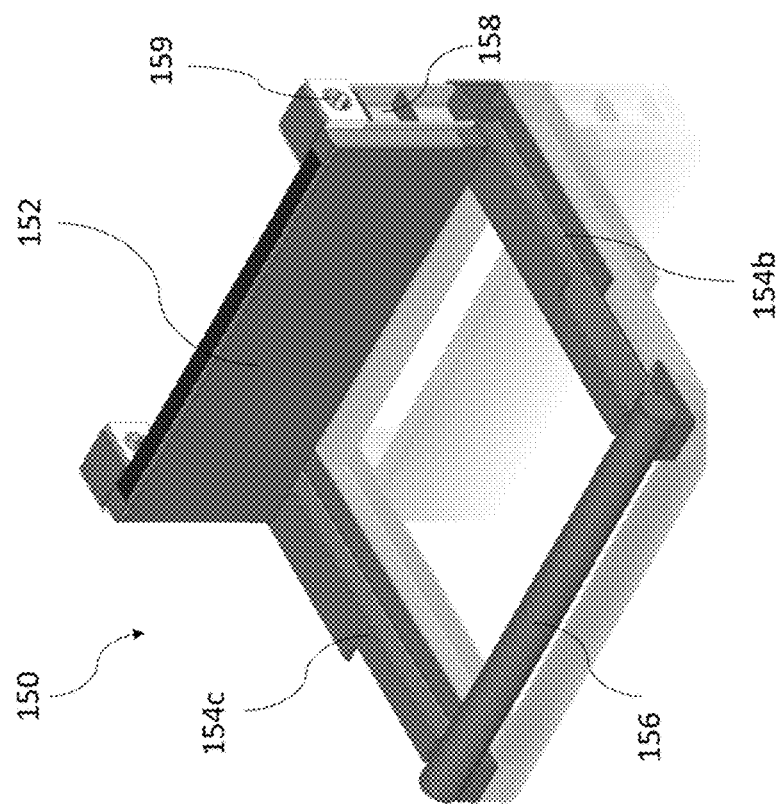
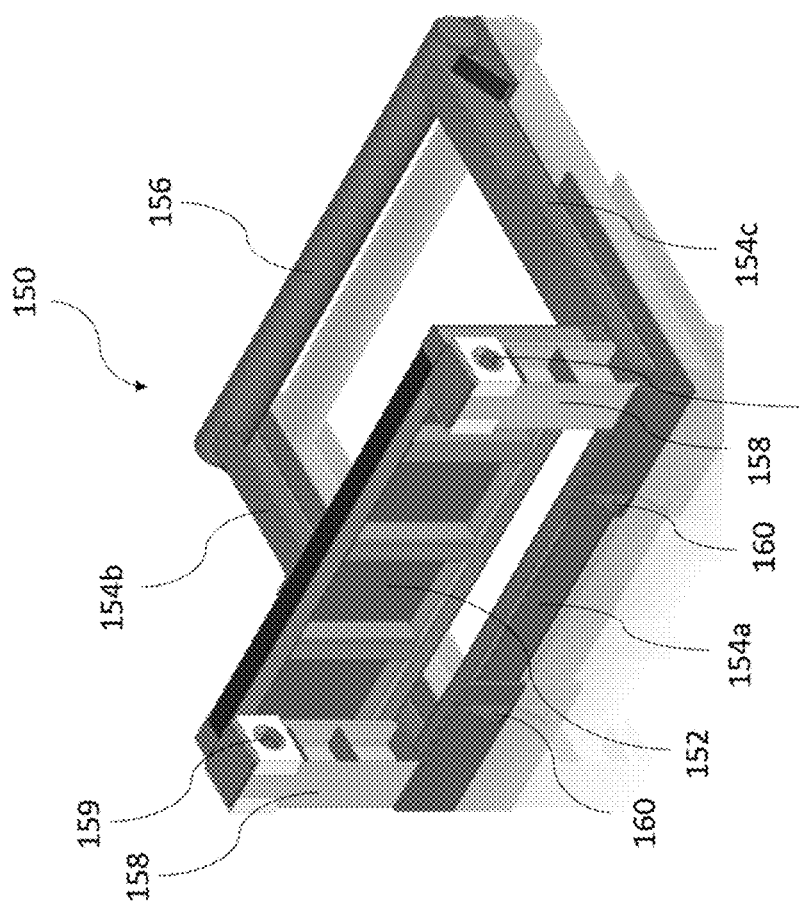
FIG. 7B
FIG. 7A

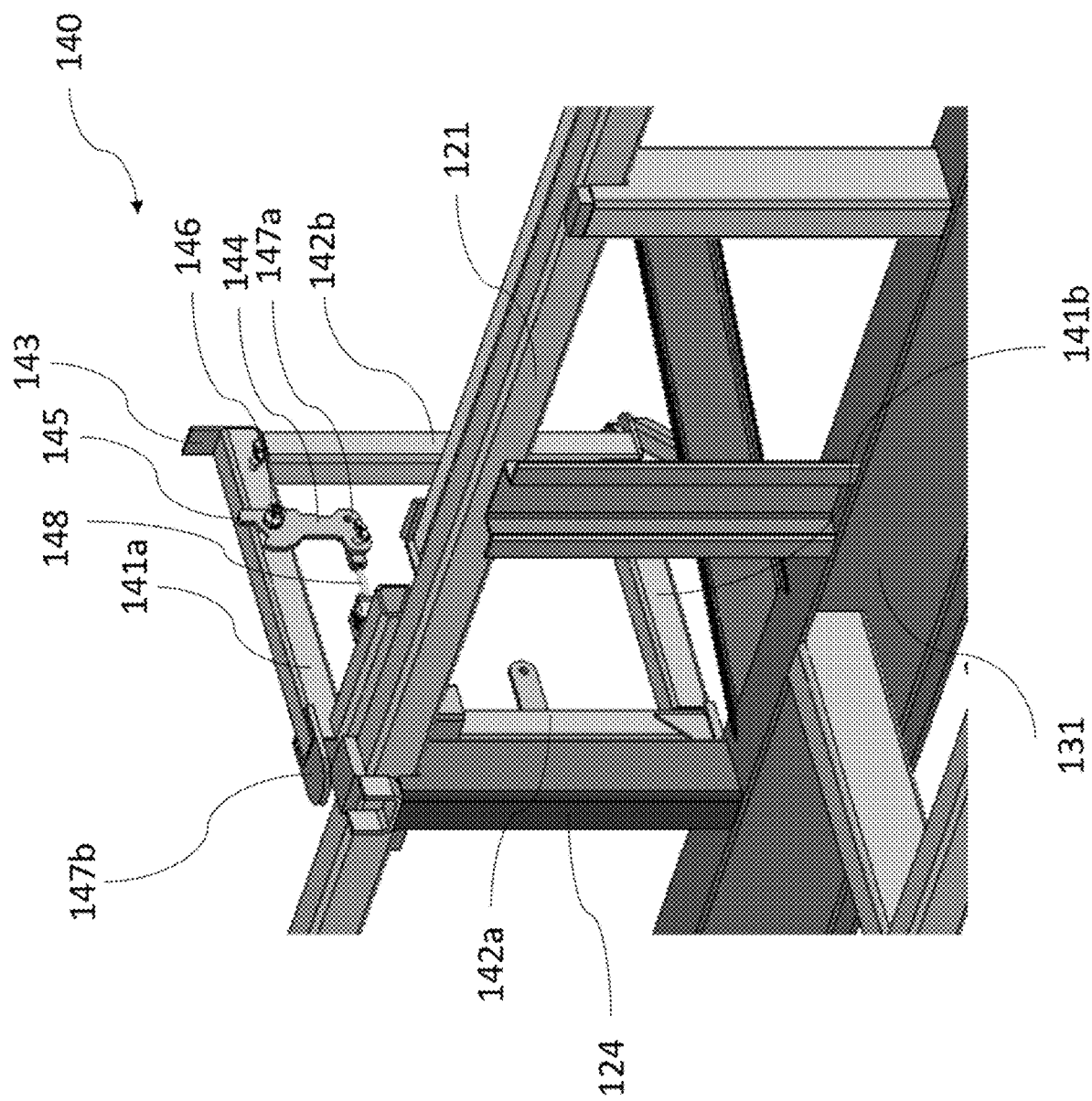

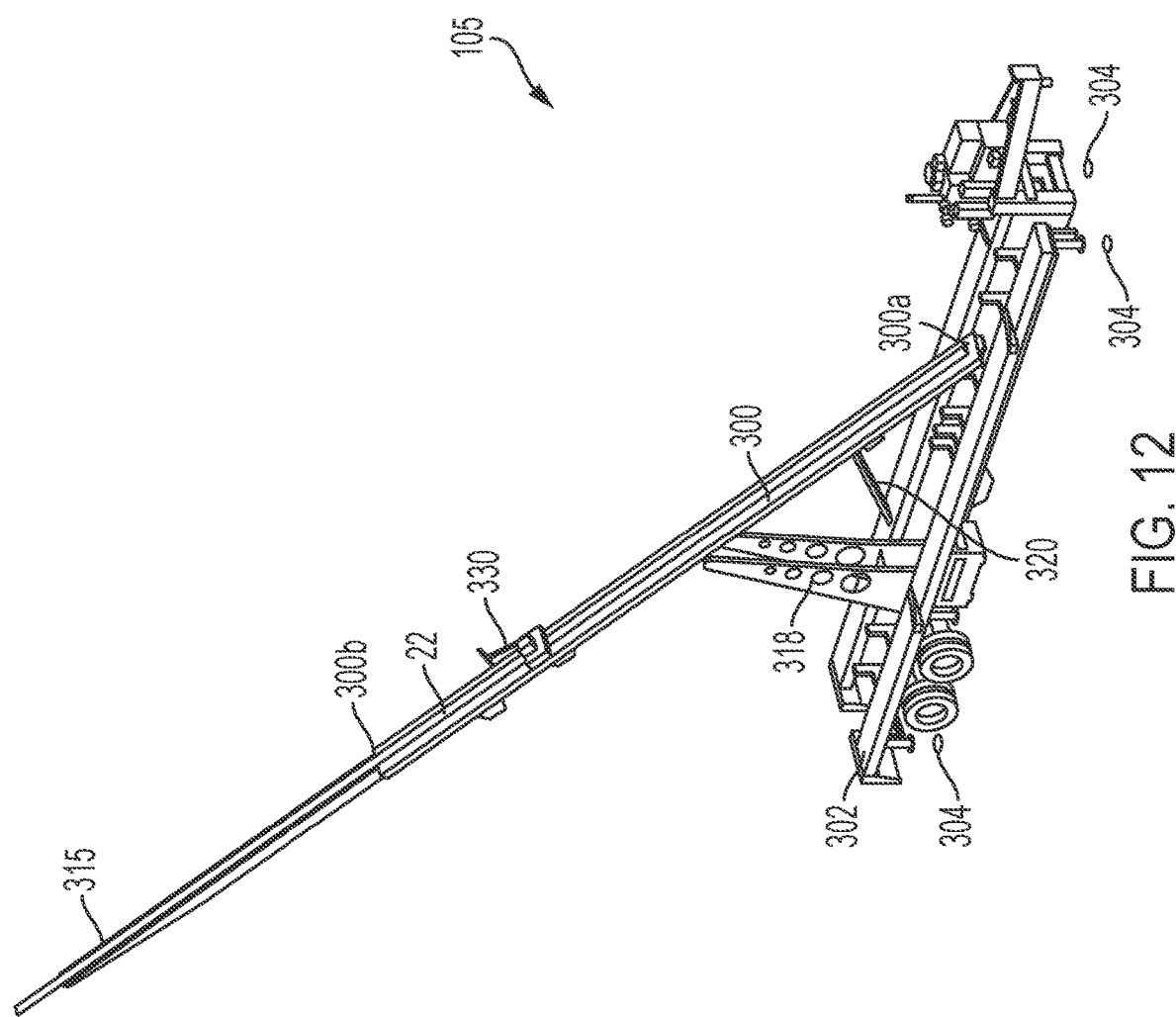

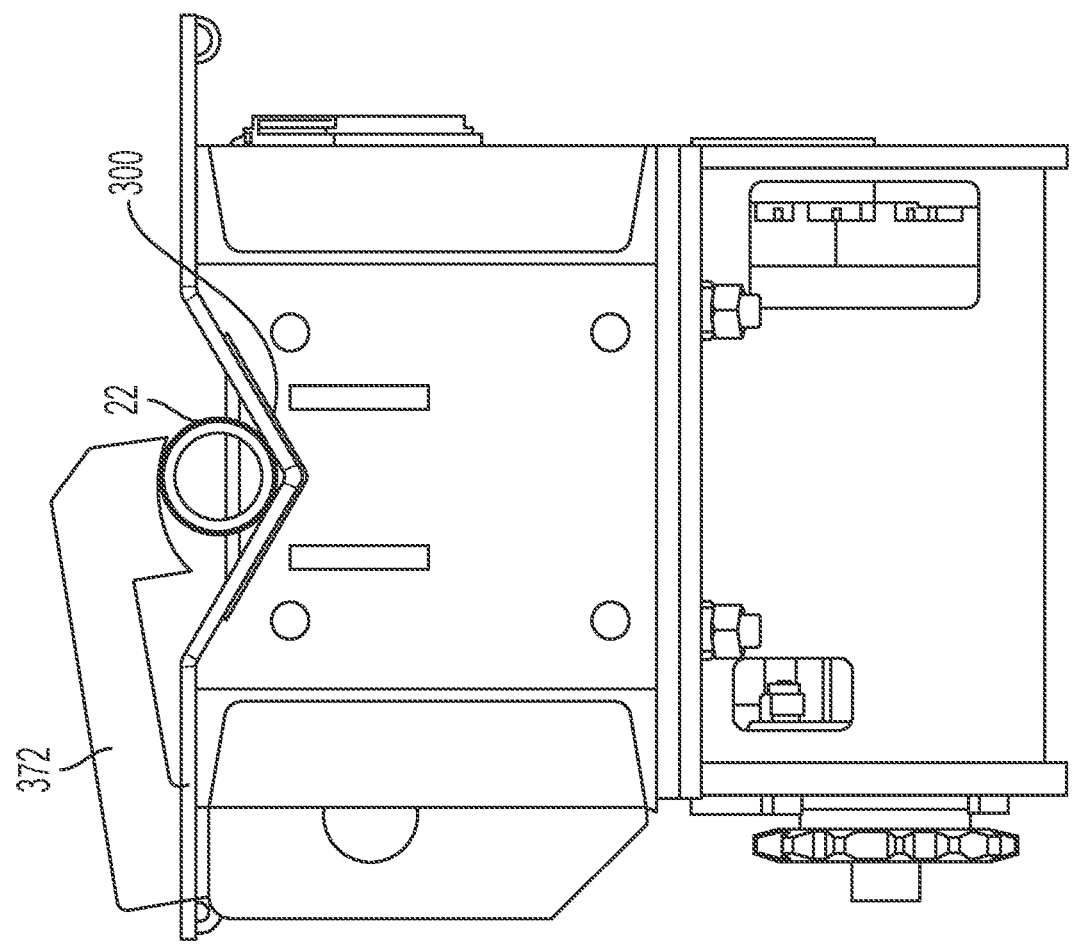

INTEGRATED PIPE HANDLING SYSTEM FOR WELL COMPLETION AND PRODUCTION

FIELD OF THE INVENTION

The field of the invention relates to an integrated pipe handling system for use in oil and gas well drilling. In particular, the invention relates to an automated and integrated system for delivering pipe to a well in previously loaded containers, transferring the pipe to a pipe handling apparatus, and delivering the pipe to a drilling rig for use in drilling, casing and well completion operations. The automated and integrated system may also receive used pipe from the drilling rig and transfer the pipe from a pipe handling apparatus back to the containers for transport away from the well site.

BACKGROUND OF THE INVENTION

In the conventional drilling of an oil and gas well, a number of drill pipes (each approximately 30 feet in length) are connected together, for example by threaded connections, to form the drill string used to drill the well bore. Each section of drill pipe is often referred to as a drill pipe joint. A borehole assembly (BHA), which includes the drill bit, is connected to the lower end of the drill string. The drill string is typically suspended from the derrick and rotated by a rotary table located on the floor of the drill rig.

As the drilling operation proceeds deeper into the earth, additional drill pipe joints must be connected to the existing string at the drilling rig floor and lowered into the borehole. Certain of the drill pipe joints may be fitted with collars or spacers or other accessories used, for example, to keep the drill string spaced from the well bore wall, or jars or sensors. For deeper wells, it may be necessary to connect hundreds of drill pipe joints together to drill the well bore to the desired depth, which may be many thousands of feet below the surface.

In addition, it is desirable to stabilize the well bore and to isolate the bore from the surrounding earth formation. This is done by cementing tubular casing in the well. Casing may be added in stages. For example, surface casing may be run into the well after drilling about 500-1,000 feet. Subsequently, intermediate casing, which has a smaller diameter than the surface casing, may be run into the well over the next several thousand feet. Finally, production casing having yet a smaller diameter may be run into the well to the depth and location of the production zone.

When casing is added, the drill string must first be removed, or tripped out of, the well. As the drill string is removed, the drill pipe joints must be disassembled from the drill string and stored temporarily for later use. If no further drilling is anticipated, the drill joints are disassembled and prepared for shipment off site. Casing is run into the well in segments (typically in lengths of about forty feet), connected end to end, for example, by threaded connections. The casing segments may be referred to as casing joints. The casing string is cemented in place by pumping cement at high pressure into the well where it is forced up the annulus between the outer surface of the casing and the side of the well bore. After surface or intermediate casing is cemented in place, the drill string is tripped back into the well to drill to a further depth using a drill bit having a smaller diameter than used previously. In this process, the drill pipe joints used previously are again connected one by one as the drill string is lowered into the well, and additional drill pipe joints are added as the hole is further drilled to a lower depth.

Drilling may proceed in a vertical or near vertical direction to a certain depth, for example as much as 7,000 to 10,000 feet. Thereafter, the direction of the well bore may deviate from vertical. Known techniques exist whereby a well bore can be turned, or dog legged, from an approximately vertical orientation to an approximately horizontal orientation. Thereafter, drilling may continue along a horizontal length of up to several thousand feet into the target production zone. Although each drill pipe joint is relatively rigid, the drill string collectively is flexible due to its large length relative to the diameter of the drill pipe joints.

Once the well has been drilled to the desired depth, including any horizontal offset, the well must be completed. The drill string must again be tripped out of the well and the drill pipe joints disassembled from one another. Next, the production string is run into the well. The production string is made up of segments of production tubing connected end to end, for example by threaded connections. The production tubing provides a conduit for the oil or gas to travel from the production zone to the surface.

As can be appreciated, the process of producing a well involves many steps during which the drilling, casing and completion operation must be interrupted to add joints to the string as the string is lowered into the well or remove joints as the string is lifted from the well. These operations are also interrupted when it is necessary to trip the drill string in its entirety out of the well. It is desirable to increase the efficiency of these operations in order to minimize the time necessary to drill, case and complete a well. Doing so diminishes costs for the drill operator and thus increases profit, and may determine the economic viability of a particular well project.

Drill pipe joints, casing joints and production tubing segments, sometimes referred to collectively herein as pipes, are typically stored horizontally on racks located near the drilling rig prior to being lifted to the drilling rig floor and deployed into the well. These pipes can weigh from several hundred to in excess of a thousand pounds and are typically handled with machinery. Typically, a gripping and hoisting device may be employed to transfer pipes from racks adjacent the drilling rig to a catwalk, and then to further transfer the pipes up a ramp to the drilling rig floor where they can be added to the drill string. Such a system is described, for example, in U.S. Pat. No. 6,976,540 to Berry. Other systems employ a power swivel, which engages the threads on the pipe before lifting it to the drilling rig floor. Still other systems employ elevators or clamps to lift a pipe to the drilling rig floor. Other systems have used pipe handling trailers to transfer pipe to the drilling rig floor, for example, U.S. Pat. No. 9,388,647.

Pipes are typically transported to the well site by truck and loaded and aligned onto the racks by forklift or crane. This process makes it challenging to keep track of the individual pipes and the number of pipes ready for deployment into the well in an automated or centralized fashion. It is also challenging to systematically or automatically control the order in which the pipes are added to the drill, casing or production string. In addition, the size and weight of the pipes makes them potentially dangerous to the personnel working on or near the drilling rig.

It is therefore desirable to improve the efficiency of the process of delivering pipes to a well site on the proper schedule and to track each individual pipe and tally the number of pipes ready for deployment into the well, and returned after removal from the well. It is further desirable to have an integrated system in which each pipe is pre-sorted into containers prior to arrival at the well site and transferred in an automated fashion from the containers to the drilling rig floor. Such an integrated system streamlines and organizes the process of delivering pipes to and removing pipes from the drilling rig floor, thereby increasing efficiency and ultimately the profitability of the drilling rig. It is also desirable to improve the safety of the workers around the pipes by having an integrated system that automates pipe handling functions.

SUMMARY OF THE INVENTION

These shortcomings of the prior art are addressed by providing an integrated pipe handling system and method comprising one or more movable containers for storing and transporting cylindrical objects such as drill pipe joints and a movable platform for receiving those cylindrical objects and transferring them to the drilling rig. The movable containers comprise unique and novel features including, but not limited to lift arms, indexing racks, crossover racks and a control system as herein described and set forth in the claims. The movable platform contains unique and novel features including, but not limited to, an angularly movable surface for moving cylindrical objects at an angle and a skate slidably movable along the angularly movable surface for supporting a cylindrical object at a plurality of positions along the angularly movable surface as herein described and claimed. Other unique and novel features such as a skate clamp, pipe clamp and pop-up stop as herein described and set forth in the claims.

A control system is also provided and may be used in a manual mode or an automatic mode to operate the movable containers and movable platform. In addition, information about each cylindrical object, such as its unique identifier, type, length, diameter and weight may be contained on a label, barcode, RFID tag or the like affixed to the object and may be recorded when the cylindrical objects are loaded into the movable containers. Information about the movable containers, such as a unique identifier, for example a number or alphanumeric code, may also be recorded. This information may be used to control the operation of the integrated system to ensure that the correct pipe is delivered to and removed from the drilling rig in the correct order without wasted time or effort.

These and other aspects of the invention are described more fully below in the detailed description of the invention and the drawings, and are set forth in the accompanying claims appended hereto.

BRIEF DESCRIPTION OF THE FIGURES

Appended FIGS. 1-27 depict certain non-limiting embodiments of the integrated pipe handling system described herein. The figures are not intended to limit the scope of the invention but, instead, are intended to provide depictions of specific embodiments, features and non-limiting characteristics of the systems described herein.

FIGS. 1A and 1B depict a typical drilling rig with pipes arranged horizontally in a conventional manner near the drilling rig.

FIG. 2 depicts a perspective view of the delivery and arrangement of pipe tubs and pipe handling trailer with respect to the well as described herein.

FIG. 3 depicts an end view of tubs and pipe handling trailer arranged for the delivery of pipes from tubs to pipe handling trailer as described herein.

FIG. 4 depicts a perspective view of a pipe tub as described herein.

FIG. 5 depicts a top view of a pipe tub as described herein.

FIG. 6B depicts a closer view of a portion of FIG. 6A.

FIGS. 7A and 7B depict perspective views taken from different angles of a lift arm of a pipe tub as described herein.

FIG. 8 depicts a perspective view of a pipe indexer assembly as described herein.

FIG. 9 depicts a perspective view of pipes being loaded into a tub prior to delivery to a well site as described herein.

FIG. 10 depict a cross sectional view taken along line 10-10 of FIG. 11 of a pipe tub loaded with pipe as described herein.

FIG. 11 depicts a perspective view of empty and full pipe tubs arranged relative to a pipe handling trailer at the well site as described herein.

FIG. 12 depicts a pipe handling trailer with a V-trough and skate in a raised position as described herein.

FIG. 15A depicts an end-on view of the V-trough showing a pipe clamp engaging a pipe thereon.

FIG. 16 is an end view of a portion of a pipe tub and pipe handling trailer with a pipe in position to be transferred from tub to trailer as described herein.

FIG. 17 is a flowchart depicting the automatic operation of a pipe handling trailer control module delivering pipe from pipe trailer to drilling rig as described herein.

FIG. 18 depicts an end view of tubs and a pipe handling trailer arranged for the delivery of pipes from pipe handling trailer to tubs as described herein.

FIG. 19 depicts a perspective view of a pipe handling trailer with a pipe in position to be ejected by pipe kickers as described herein.

FIG. 20 depicts an end view of a portion of a pipe tub and pipe handling trailer with a pipe in position to be transferred from trailer to tub as described herein.

FIG. 21 depicts a perspective view of a pipe tub and pipe handling trailer with a pipe in position to be transferred from trailer to tub as described herein.

FIG. 22 is a flowchart depicting the automatic operation of a tub control module delivering pipe from tub to pipe trailer as described herein.

FIG. 23 is a flowchart depicting the automatic operation of a pipe handling trailer control module receiving pipe from a drilling rig onto pipe handling trailer as described herein.

FIG. 24 is a flowchart depicting the automatic operation of a tub control module receiving pipe from pipe trailer into a tub as described herein.

FIG. 25 is a schematic diagram showing the components and functions of an integrated pipe handling control system as described herein.

FIG. 26 depicts a close perspective view of two adjacent filled pipe tubs as described herein.

FIG. 27 depicts a closer in perspective view of FIG. 26 showing more detail of the arrangement of racks between the two tubs as described herein.

DETAILED DESCRIPTION OF THE INVENTION

Figure 1B:
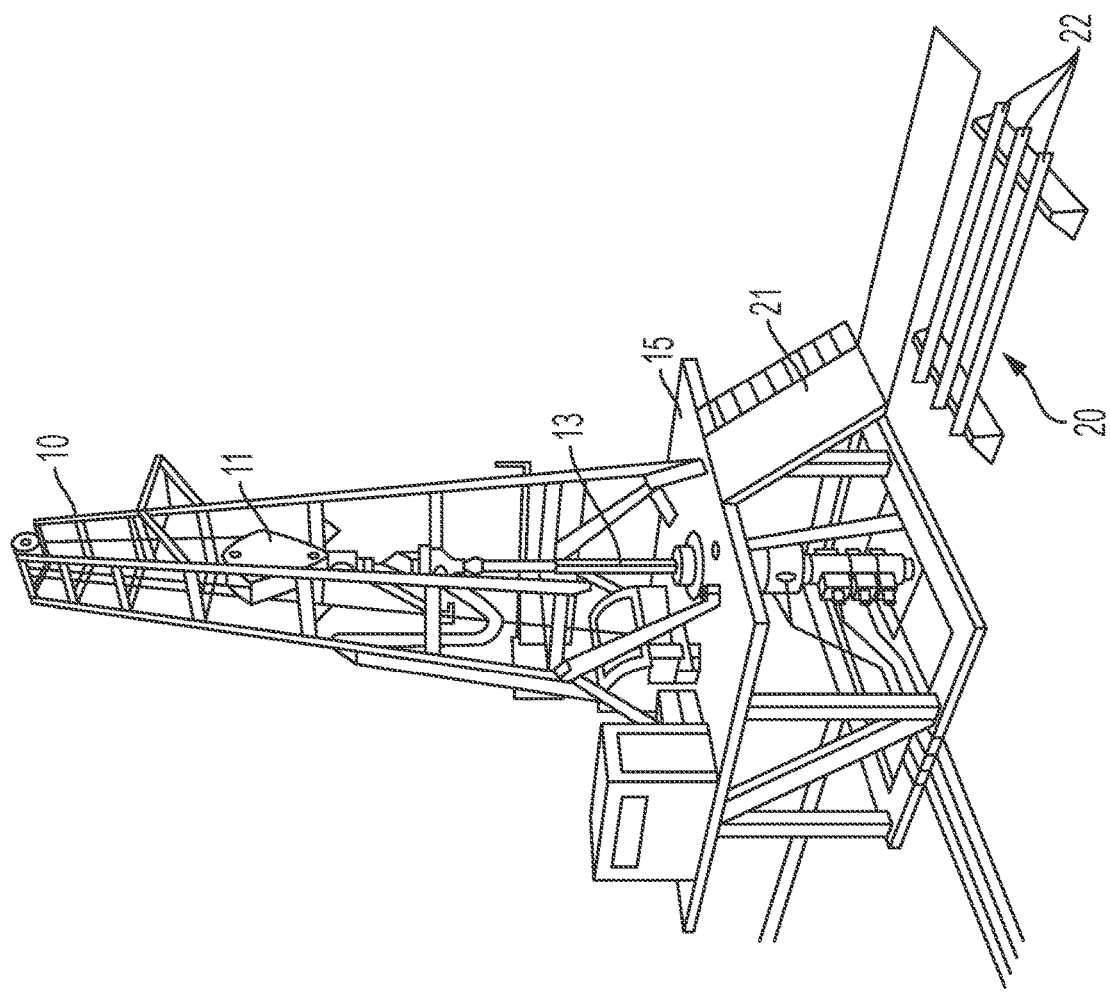

An exemplary drilling rig 1 is shown schematically in FIG. 1A. Drilling rig 1 includes derrick 10. Travelling block 11 is suspended from the top of derrick 10. A hook on the travelling block suspends a swivel 12, which is free to rotate in a horizontal plane. Alternatively, travelling block may suspend a direct drive motor (not shown). Kelly drive 13 is rotated by turntable 14 located on drilling rig floor 15 and engages the top of a drill joint through a bushing (not shown). Drilling fluid is pumped through the tubulars into the well via flexible hose 16. The drill string 17 is lowered into the well bore 18 as drilling proceeds. In later operations, casing joints and completion tubing is lowered into the well through the bore 18. Pipe rack 20 is located near derrick 10 and carries a plurality of pipes 22 typically arrayed horizontally as shown in FIG. 1B.

Pipe Tubs

Figure 2:
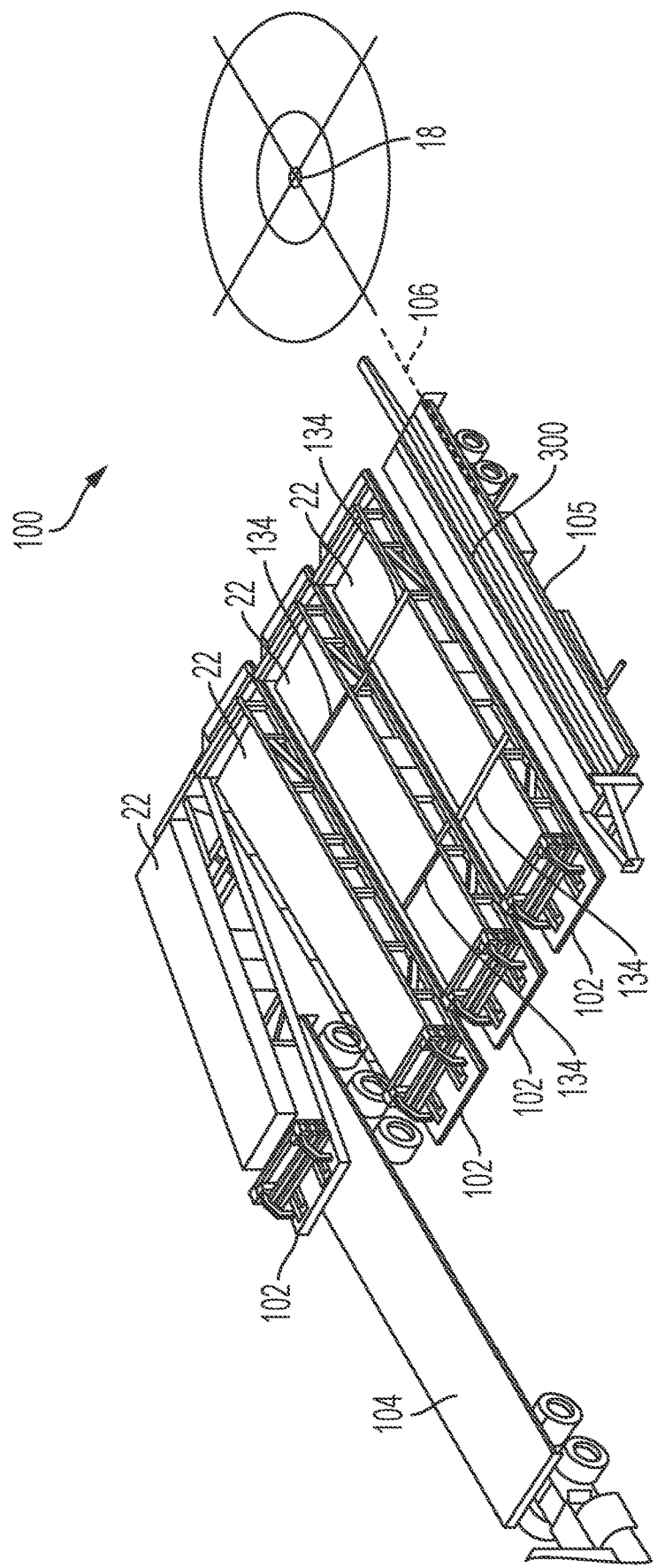

In one embodiment of the integrated pipe handling system of the present invention, pipes are delivered in a pre-sorted manner in tubs that are placed near the drilling rig prior to deployment into the well. Referring to FIG. 2, one or more tubs 100 containing pipes 22 are delivered to well site 100, for example, by a flatbed trailer 104. Each tub may be assigned a unique identifier, for example a number or alphanumeric code, which is used by the control system, described below. At the well site, tubs 102 are aligned substantially parallel to one another and to pipe handler trailer 105 such that pipes can roll from a tub toward pipe handler trailer 105 in a manner that will be described below. Pipe handler trailer 105 is generally aligned such that the vertical projection of its central longitudinal axis on the ground 106 intersects well bore 18 substantially through the well center.

Figure 3:
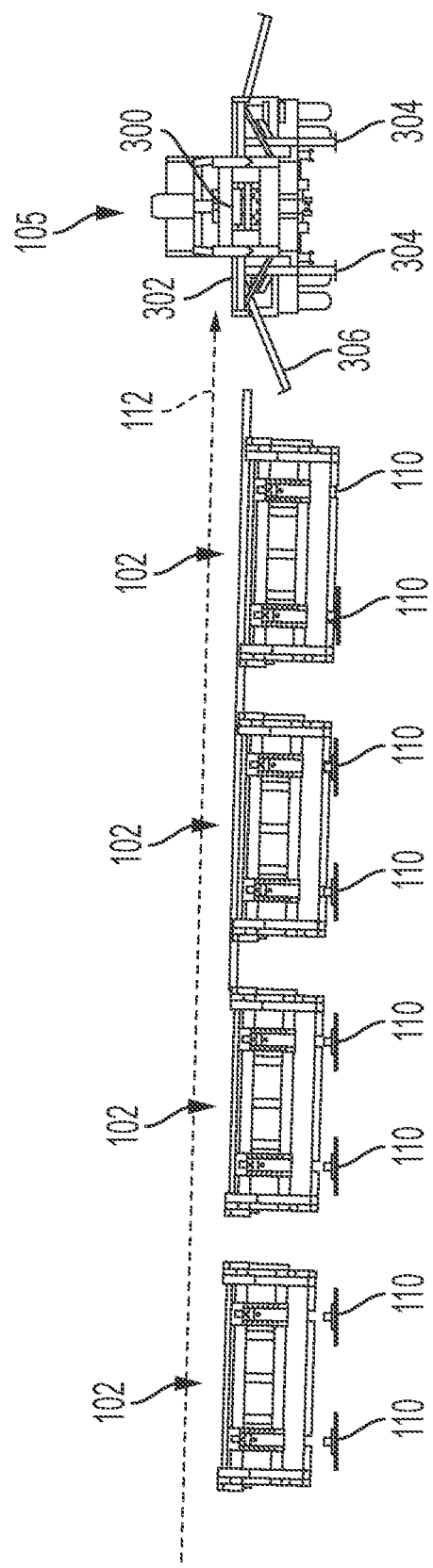

Referring to FIG. 3, each tub 102 includes adjustable feet 110 operable to control the tilt of the tub, including about its longitudinal axis. Feet 110 may be adjusted by, for example, a hydraulic motor (not shown) operated by a control system as discussed further below. Feet 110 may be adjusted such that tubs 102 are angled at a slight incline, for example about 1.5°, toward pipe handler trailer 105. Where multiple tubs are deployed, the feet on each tub may be adjusted to the correct height so that a substantially smooth, inclined slope is formed substantially in a plane 112 parallel to the tops of each tub as shown in FIG. 3. Plane 112 is angled at a slight incline, for example, 1.5°, toward pipe handler trailer 105 so that pipe may roll from tubs 102 toward pipe handling trailer 105 as described below. Adjustable landing gear 304 of pipe handling trailer 105 may also be adjusted so that pipe handling trailer is inclined at a slight angle away from tubs 102 such that pipe 22 may roll over trailer bed 302 and into V-trough 300 as described below.

Figure 6A:
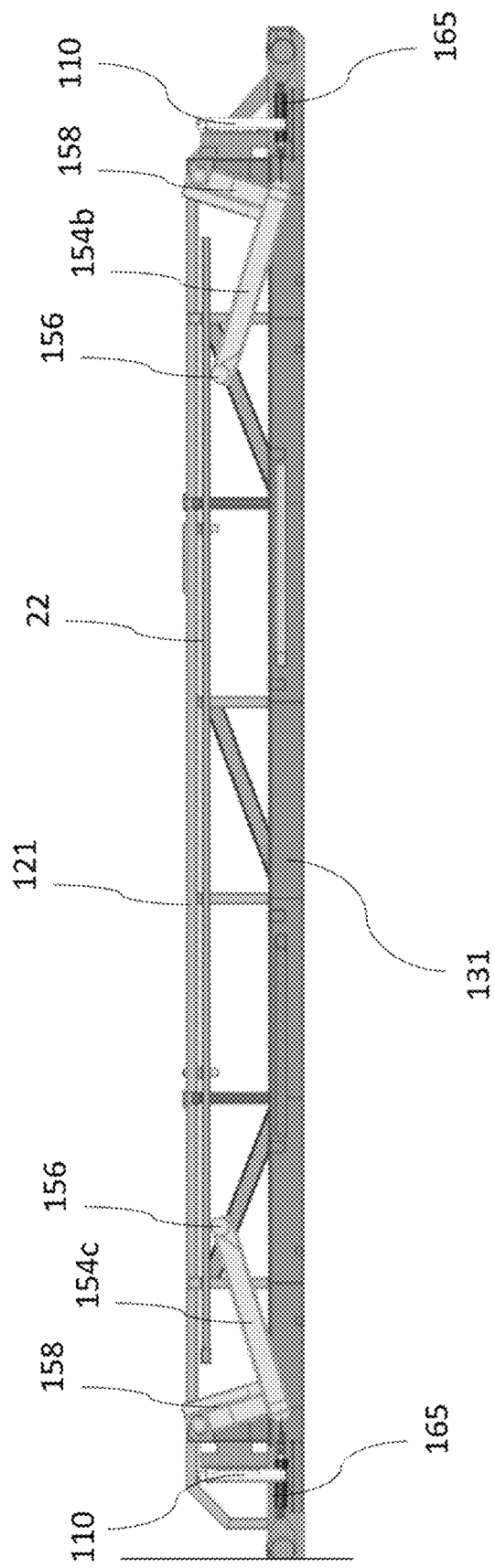
FIG. 6A depicts a cross-sectional view of a pipe tub taken along line 6A-6A in FIG. 5.

Referring to FIGS. 4-6, tub 102 includes side frame members 120a and 120b and end frame members 122a and 122b. Side frame members may comprise a plurality of vertical and diagonal members 124, 125 and upper member 121. End frame members 122a and 122b may include a plurality of horizontal beams 126 attached to vertical corner posts 128 preferably by welding. Each corner post 128 includes pin 129 for pivotally attaching lift arms 150 disposed at the tub ends (see FIGS. 6A-7B). The tub bottom may be formed by bottom beams 130 attached between bottom rails 131, preferably by welding. The tub bottom may also include additional bottom diagonal beams 132 disposed between side frame members 120a and 120b to impart strength and stability to the tub.

Referring to FIGS. 6A, 6B, 7A, 7B, lift arms 150 may include vertical side wall 152, bottom frame members 154a, 154b, 154c, and cylindrically shaped raising arm 156, all of which may be connected together such as by welds. Vertical hangar posts 158 may be attached to side wall 152 and one or more bottom frame members 154a, 154b, 154c. Pivot holes 159 for receiving pins 129 are disposed in vertical hangar posts 158 for pivotally mounting lift arms 150 relative to tub 102. Piston 165 is pivotally attached at one end to bottom rail 131 via pivot point 167 and pivotally attached at its other end to piston rod 164. Bottom frame member 154a further includes flanges 160 for engaging with piston rod 164 to pivot lift arm 150 relative to tub 102 about a pivot axis formed through pin 129 and pivot hole 159 via the driving force of piston 165.

Figure 26:
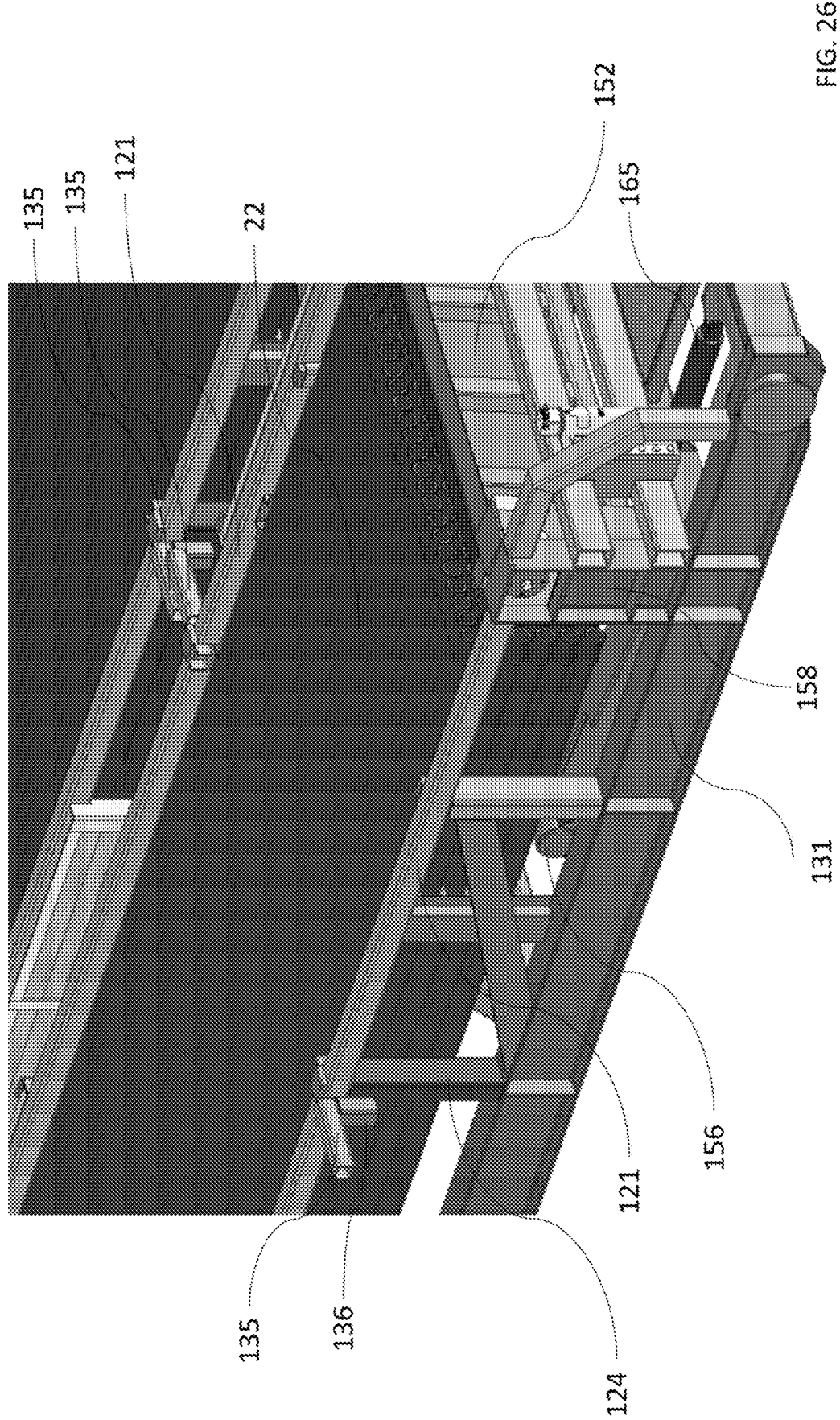
Figure 27:
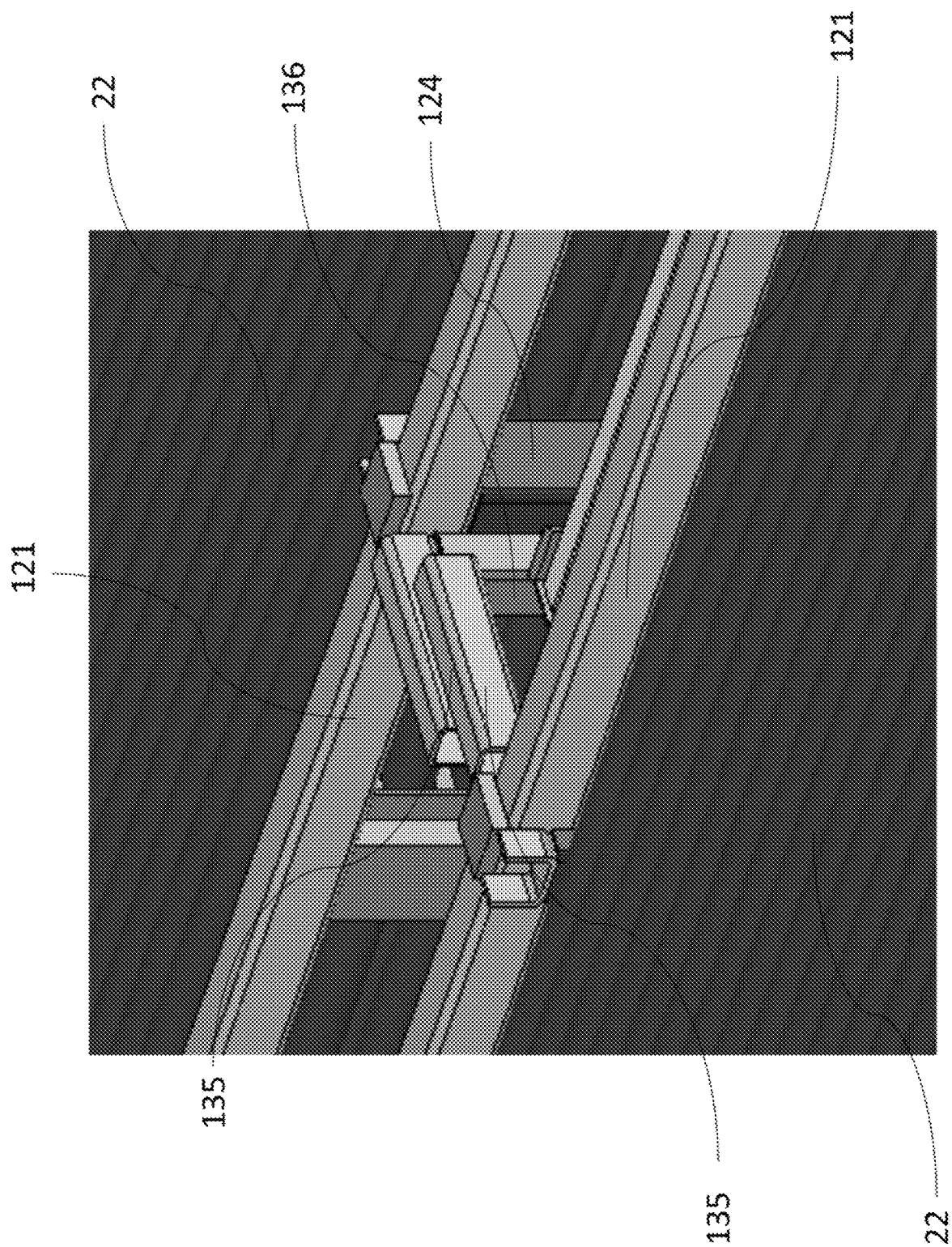

Tub 102 may also include a plurality of removable L-shaped drop-in racks 135. A shorter leg of drop-in rack 135 may removably engage a hollow pocket 136 disposed on upper member 121 of end frame members 120a and 120b such that the top surface of the longer leg of drop-in rack 135 is flush with the top surface of upper member 121 (see FIGS. 26-27). Some tubs may include drop-in racks 135 on both sides such as shown in FIG. 5. Drop-in racks 135 may include a proximity switch or other sensor (not shown) to sense the presence of a pipe on or near drop-in rack 135. The tub arranged closest to pipe handler trailer 105 at wellsite 100 may include pipe indexer assembly 140 on the side closest to pipe handler trailer 105 such as shown in FIG. 4. Some tubs may include pipe indexer assembly 140 on both sides to enable the tub to be positioned on either side of pipe handling trailer 105.

As shown in FIG. 8, pipe indexer assembly 140 may include top and bottom frame members 141a, 141b, and side frame members 142a, 142b. The top surface of top frame member 141a may be flush with the top surface of upper side frame member 121. Stop plate 143 may be attached to top frame member 141a at one end and projects above the top surface of top frame member 141a. Indexing plate 144 may contain projection 145 and may be pivotally attached at one end to top frame member 141a through pivot axis 146 and may be pivotally attached to piston rod 148 through pivot axis 147a at its other end. A proximity switch or like sensor (not shown) may be located on top frame member 141a near indexing plate 144 to detect the presence of a pipe 22 at or near the location of projections 145. Pipe indexer assembly 140 may be pivotally attached to vertical side frame member 124 so as to allow pipe indexer assembly 140 to swing outward from side frame 120a, 120b about vertical pivot axis 147b to an operating position approximately 90° from a storage position parallel to side frame member 120a, 120b. Pipe indexer assembly 140 also may include piston 149 attached to side frame 120a of tub 102 to actuate indexing plate 144 from a position wherein projection 145 blocks pipe 22 from rolling toward pipe handling trailer 105 to a position where pipe 22 is not blocked (see FIG. 14).

Tub Loading

Figure 9:
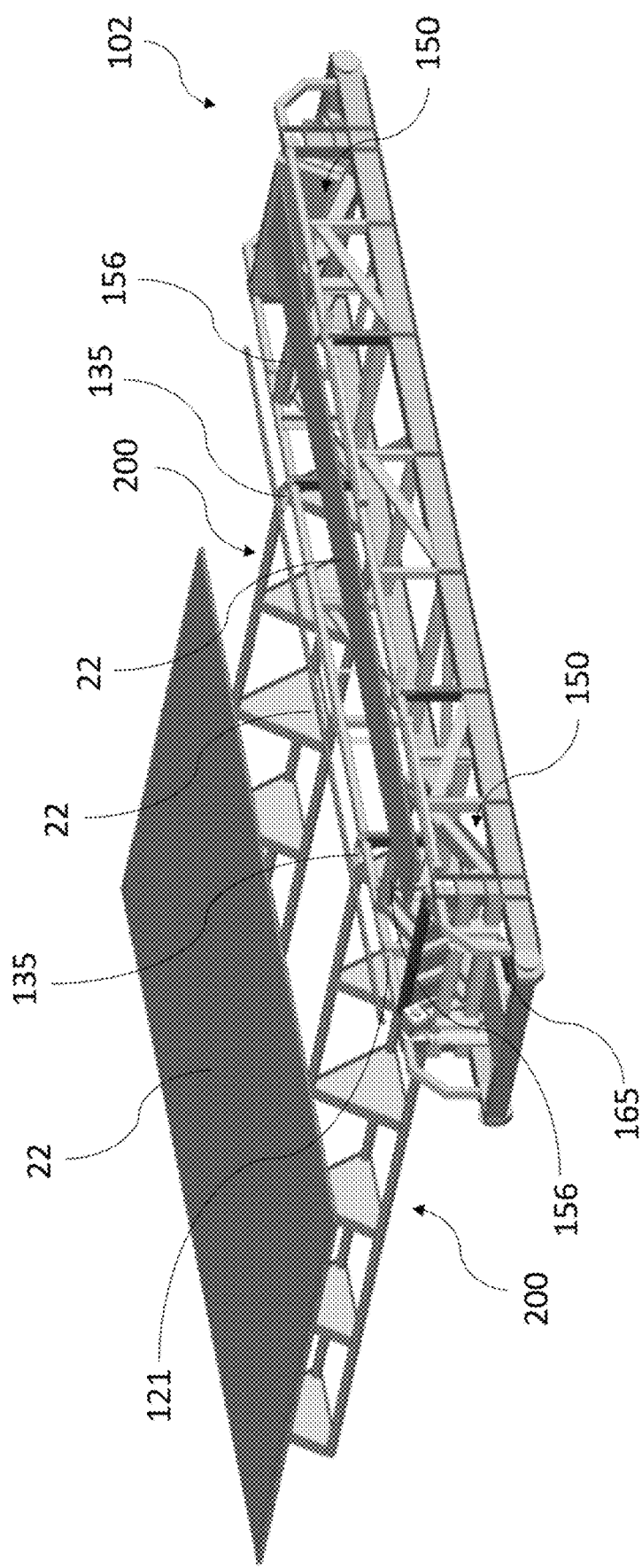

Prior to deployment at the well site, tubs 102 may be loaded with pipes 22. Pipes 22 may include, for example, drill pipe joints, casing joints or production tubing segments. Referring to FIG. 9, pipes 22 may be arrayed on racks 200 prior to loading into tub 102. Racks 200 and tub 102 may be adjusted generally level with respect to the ground. Lift arms 150 may be raised such that raising arms 156 are at a level slightly below the top surface of top side frame member 121. Pipe 22 may be rolled into tub 102 using machinery such as a forklift or by manpower from racks 200 over drop-in racks 135 and onto raising arms 156. After a complete row of pipes have been rolled onto raising arms 156, lift arms 150 may be lowered to a level such that spacers 170 (see FIG. 10) may be installed over the row of pipe loaded into the tub and the tub is ready to receive the next row of pipe. The process may be repeated until the tub is filled with pipe.

Information about each pipe 22, such as its unique identifier, type, length, diameter and weight may be contained on a label, barcode, RFID tag or the like affixed to the pipe. The information about each pipe may be recorded as it enters tub 102. In addition, information as to the total number of pipes loaded into the tub, and the order in which the pipes are loaded into the tub, may be recorded. Such information may be recorded manually by an operator, for example, by keying in information on a computer or mobile device such as a smartphone or tablet or terminal equipped with the necessary application software. Alternatively, an operator may use a scanning device to scan a label, bar code or RFID tag affixed to each individual pipe 22 that contains information about that pipe. In yet another alternative, a scanning or other sensing apparatus may be positioned to automatically record bar code or RFID tag information affixed to each pipe as it is loaded into tub 102. The information about each pipe and the number and order of pipes loaded into the tub may be stored in memory associated with control system 500, as described below. In addition, each tub 102 may be assigned a unique identification number or code, which may be encoded on a label, barcode, RFID tag or the like, and is recorded manually by an operator or scanned by equipment as described above. Information about the identification of each tub 102 may also be stored in memory associated with the tub control system and correlated to the information about the pipes contained within the tub as described below.

Figure 10:
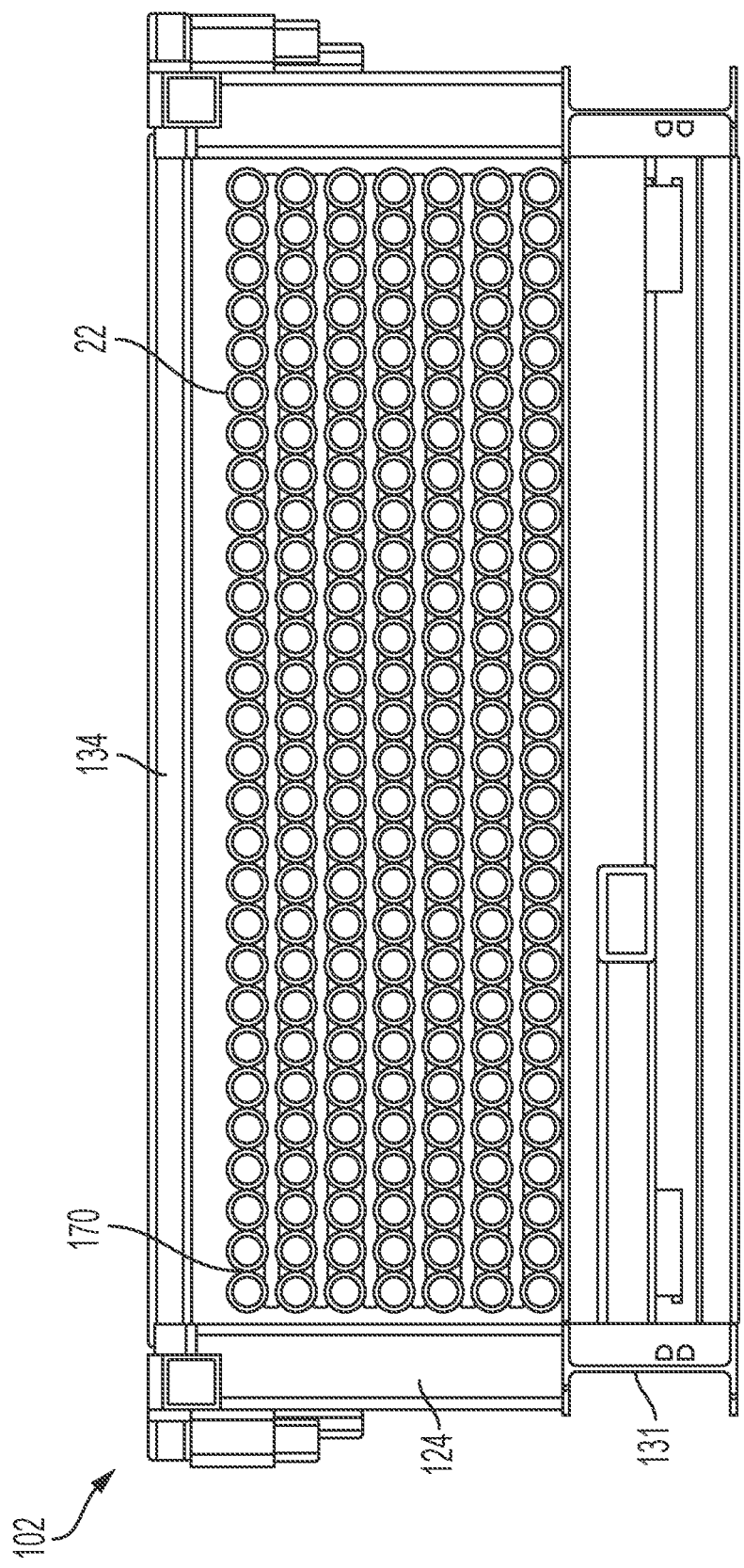

Pipes 22 may be loaded into tub 102 such that they are stored in tub 102 in multiple rows, as shown in FIG. 10. Sensors (not shown) may be installed within tub 102 to sense the presence of one or more rows of pipes. The initial row of pipes loaded into the tub rest on top of raising arms 156 of lift arms 150, which are raised to a position below the level of the top surface of upper side frame member 121 by the action of pistons 165 as previously described. Once a complete row of pipes are loaded into tub 102, an operator may install a separator above the row of pipes. A suitable separator may include a spacer 170 composed of a hardwood or other material that will not readily deform or warp under the weight of the pipes and that has a smooth, flat surface to enable pipes to roll over spacer 170. A subsequent row of pipes then may be loaded into tub 102 by lowering lift arms 150 by a distance approximately equal to the diameter of the pipes plus the height of spacer 170, and allowing the row of pipes 22 to be rolled into tub 102. Another spacer 170 then may be installed above the second row of pipes. This operation may be repeated to fill tub 102 with multiple rows of pipes 22 such as shown in FIG. 10. Upon completion of loading, crossover racks 134 (see FIGS. 2, 10) may be installed at the top of tub 102 such as by fitting ends of crossover racks 134 into pockets formed in upper members 121 of side frame members 120a, 120b such that the top surface of crossover racks 134 are generally flush with the top surfaces of upper members 121. Tub 102 may then be transported to well site 100, for example, by truck.

Pipe Handling Trailer

Figure 11:
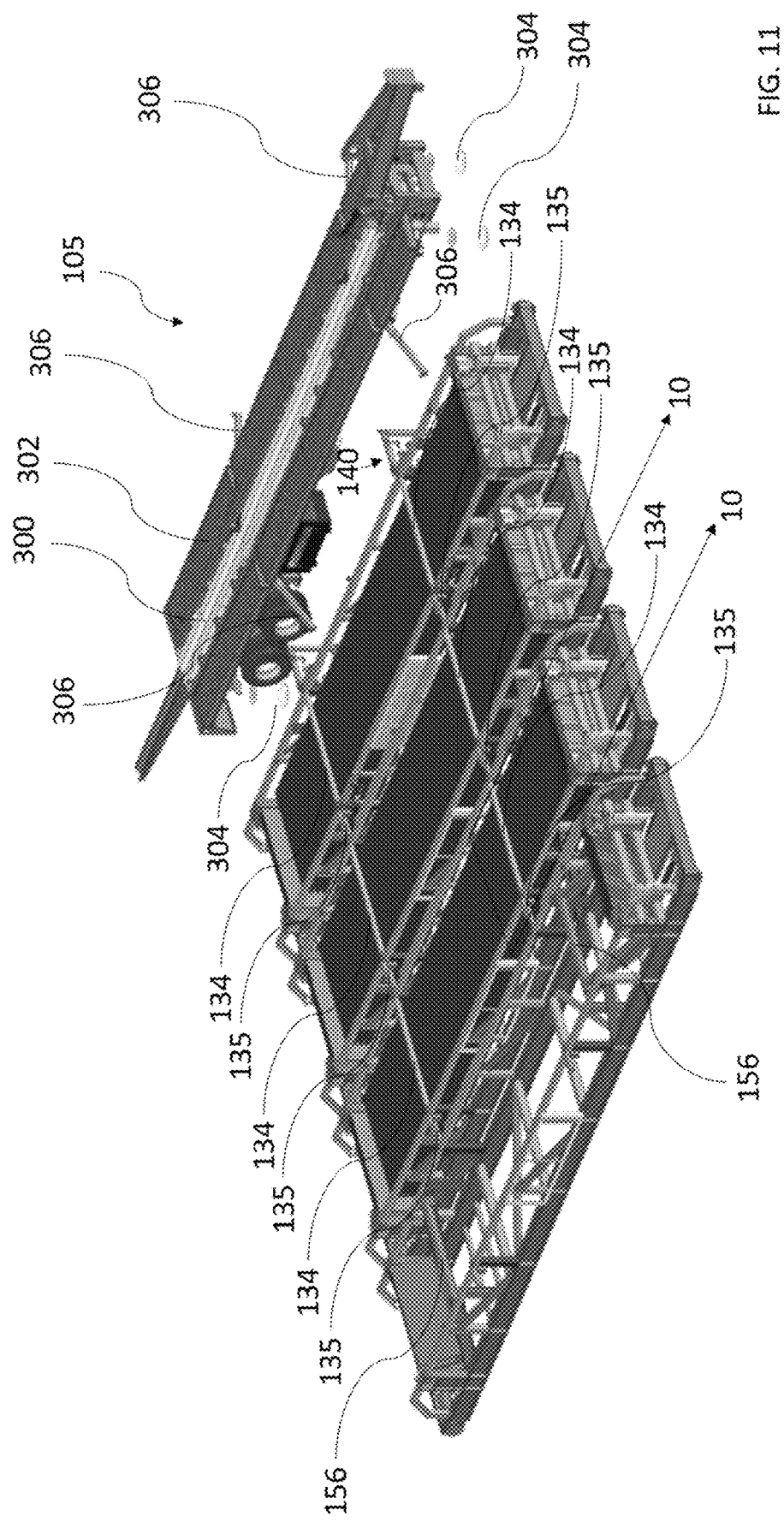

The integrated pipe handling system may also include pipe handling trailer 105. Pipe handling trailer 105 may include V-shaped trough assembly 300 which can be raised or lowered at an angle relative to the level of trailer bed 302 by a hydraulic motor (not shown). While V-shaped trough 300 is generally described herein as v-shaped in cross section, it is understood that the trough may have other cross-section shapes suitable for retaining pipe, such as a u-shape. Referring to FIG. 11, pipe handling trailer 105 may also include adjustable telescoping landing gear 304 operated by hydraulic motors (not shown) to level trailer bed 302 or incline trailer bed to a desired angle relative to the ground. Pipe handling trailer may include picker arms 306 for transferring pipe from indexing assembly 140 of the closest tub to pipe handling trailer 105 as described below. Picker arms 306 may be pivotally attached to pipe handling trailer 105 and may be actuated by pistons 308 (see FIG. 14). Picker arms 306 may include telescoping members that allow the length of picker arms 306 to be adjusted relative to the location of tub 102 at the well site to enable picker arms 306 to interact with pipe indexing assembly 140 as described below. Picker arms 306 may also include raised stop portions 310 that project above the top surface of the picker arm. Picker arms 306 may be located on both sides of pipe handling trailer 105 to allow tubs to be positioned on either or both sides of pipe handling trailer at the well site.

Referring to FIG. 12, V-shaped trough assembly 300 may be slidably mounted at one of its ends 300a to pipe handling trailer 105. Trough extension 315 may be assembled onto the other end 300b of V-trough assembly, such as by bolting, to support pipe 22 as it is raised toward or lowered from the drilling rig floor as described below. Alternatively, trough extension 315 may be constructed as a telescoping member that extends outwardly from V-trough assembly 300. V-trough assembly 300 may be pivotally mounted at a location intermediate its ends to one end of trough support 318. Trough support 318 may be pivotally mounted at its other end to pipe handling trailer 105. V-trough assembly may be raised or lowered by hydraulic piston 320 pivotally attached to V-trough assembly 300 at one end and to pipe handling trailer 105 at its other end. An angular sensor may be located at end 300a of V-trough assembly 300 to measure the angle of inclination of V-trough assembly 300 relative to trailer bed 302. V-trough assembly 300 may also include skate assembly 330 slidably mounted in trough for translating pipe 22 along the trough toward the drilling rig floor as further described below.

Figure 13A:
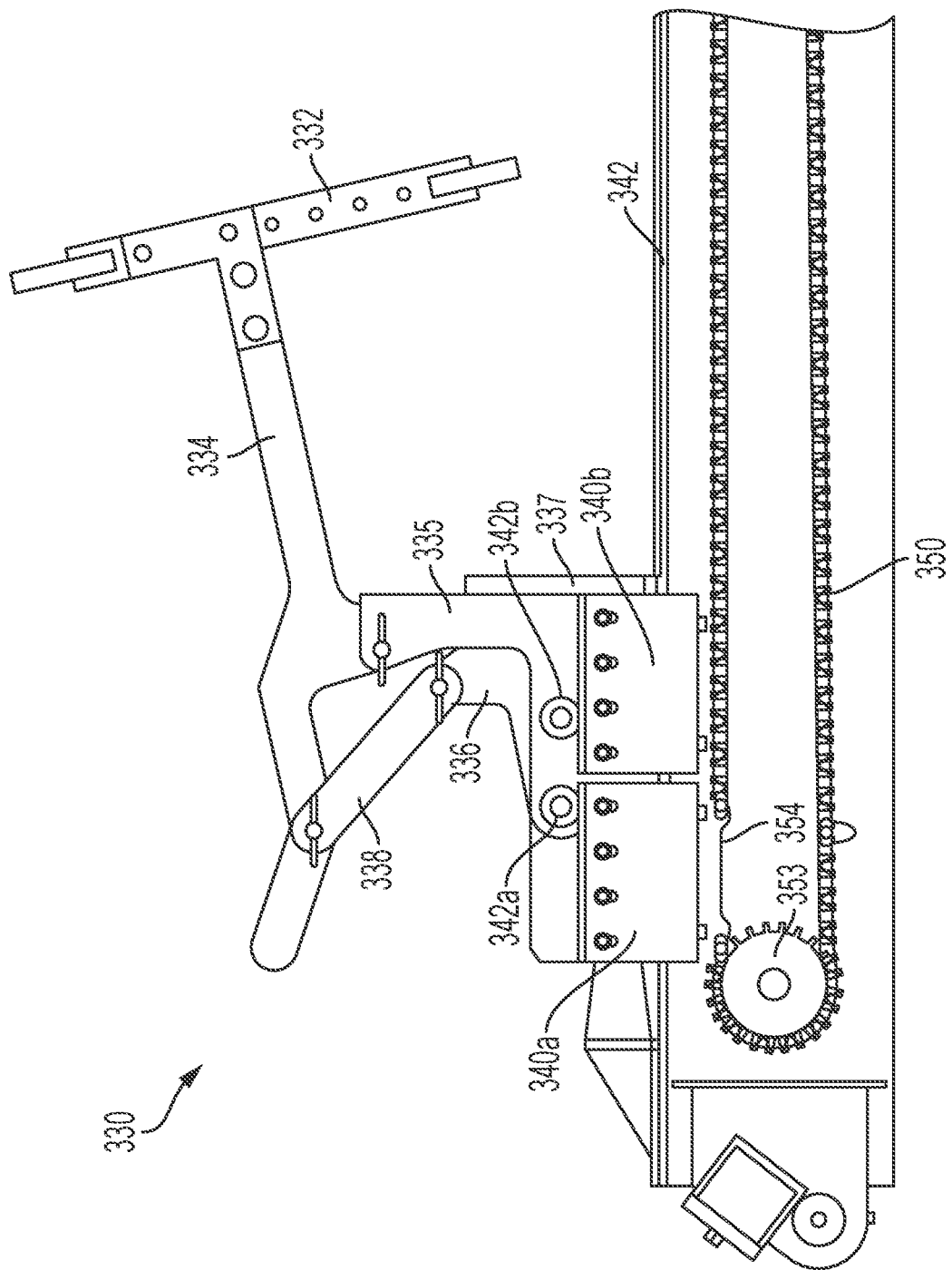
FIG. 13A depicts a cross sectional view of a skate assembly and skate drive mechanism as described herein.
Figure 13B:
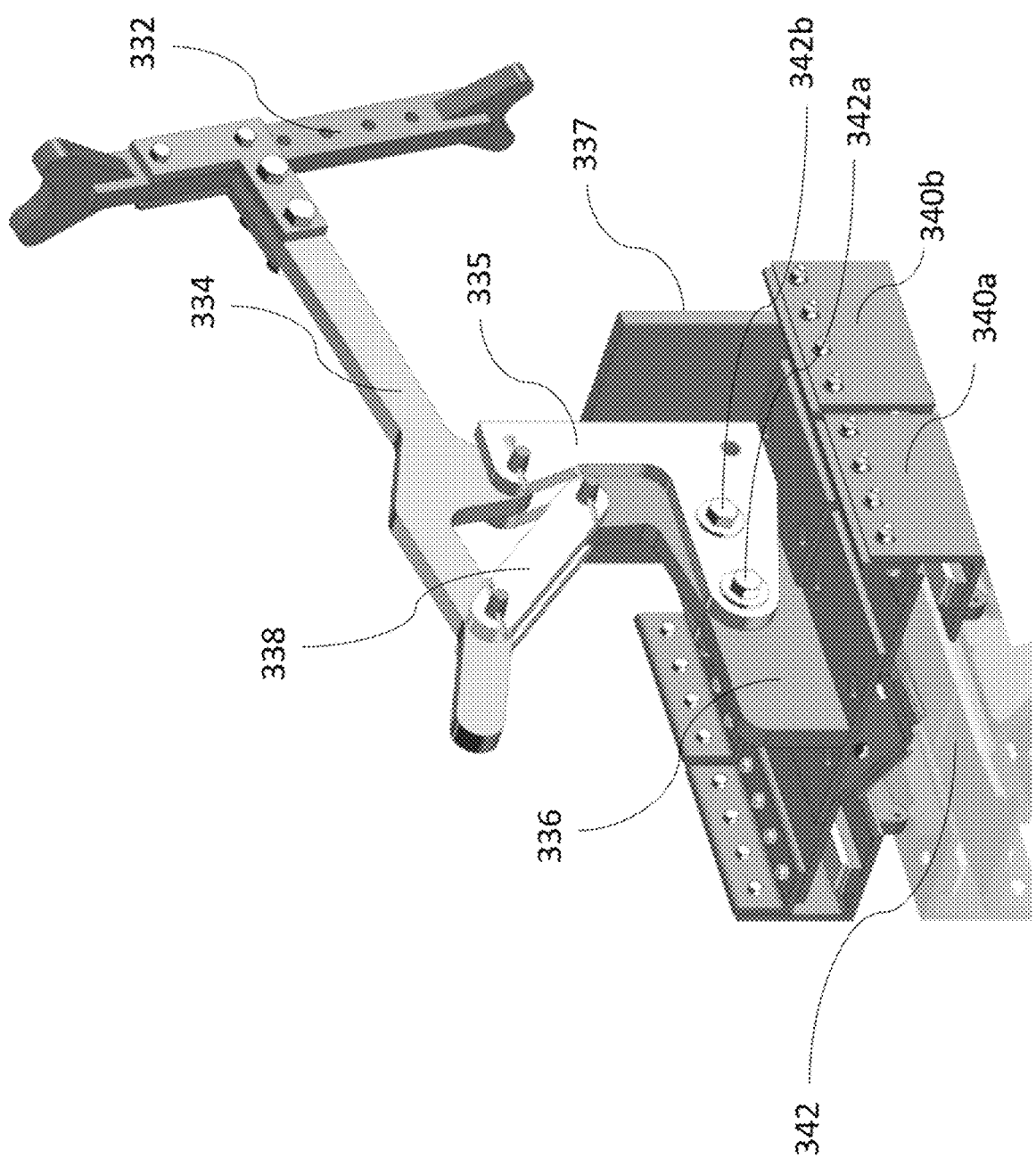
FIG. 13B depicts a perspective view of a skate assembly with a clamp arm in a raised position as described herein.
Figure 13C:
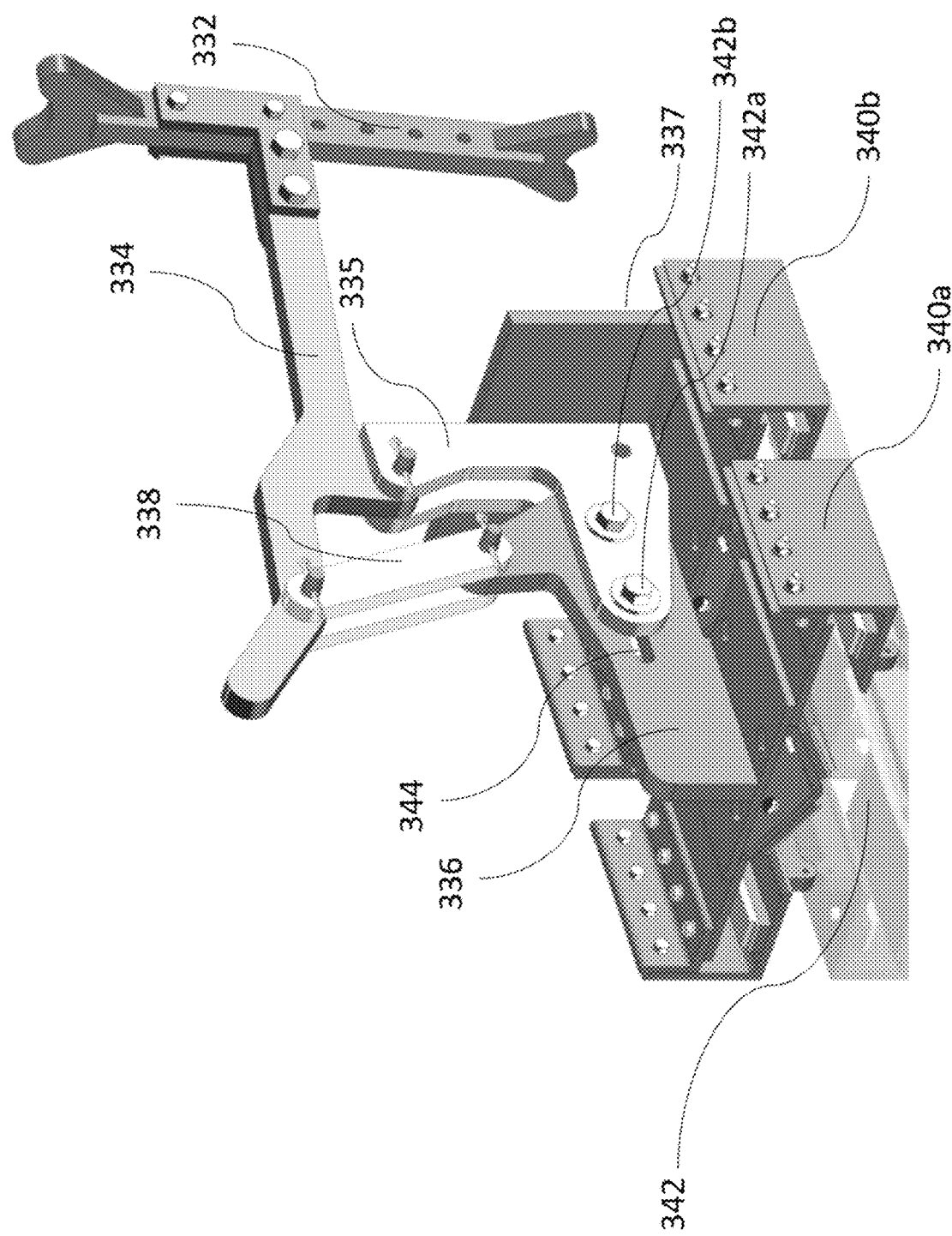
FIG. 13C depicts a perspective view of a skate assembly with a clamp arm in a lowered position as described herein.

Referring to FIGS. 13A-D, skate assembly 330 may include skate clamp bar 332 mounted to a first clamp arm 334 such as by fasteners. Skate clamp bar 332 may be orthogonally adjustable relative to first clamp arm 334. First clamp arm 334 may be pivotally mounted to skate clamp support 335 and to second clamp arms 338. Skate clamp support 335 is fixed to push plate 337 such as by welding. Second clamp arms 338 may be pivotally mounted to flange 336. First and second skate body 340a, 340b may be configured as an open box structure constructed from plates such as shown in FIGS. 13B-C. First and second skate body 340a, 340b slide along rail 342. Flange 336 is fixed to first skate body 340a such as by welding. Skate clamp support 335 and push plate 337 are fixed to second skate body 340b such as by welding. Skate clamp support 335 is slidably connected to flange 336 through pins 342a, 342b configured to slide within slot 344 (FIG. 13C). Pins 342a, 342b are preferably adjustably positioned within slot 344 in order to adjust the separation distance between pins 342a, 342b.

First skate body 340a is attached to endless skate chain 350 through connector 354 attached at both ends to links in skate chain 350. Skate chain 350 is engaged with drive pulley 352 at one end thereof and idler pulley 353 at the other end thereof. Drive pulley 352 may be driven by drive motor chain 356, which is driven by drive motor pulley 355. Drive motor pulley 355 may be driven by a drive motor (not shown) that may be powered by pipe handling trailer 105 (see FIG. 13E).

Skate assembly 330 may thus be arranged such that when first skate body 340a is driven toward the end 300b of V-trough 300 closest to the well (clockwise as viewed in FIG. 13A), first skate body 340a and flange 336 will slide toward second skate body 340b and skate clamp support 335 and the end of slot 344 closest to pin 342a will contact pin 342a. This motion will cause first and second clamp arms 334, 338 and skate clamp bar 332 to rotate in a counter-clockwise direction as viewed in FIG. 13A, and raise skate clamp bar 332 away from V-trough 300 and any pipe 22 that is in V-trough 300. When first skate body 340a is driven toward end 300a of V-trough 300 farthest away from the well, first skate body 340a will slide away from second skate body 340b until the end of slot 344 closest to pin 342b contacts pin 342b. This motion will cause first and second clamp arms 334, 338 and skate clamp bar 332 to rotate in a clockwise direction as viewed in FIG. 13A, and lower skate clamp bar 332 toward V-trough 300 and any pipe 22 that is in V-trough 300. The position of skate clamp bar 332 relative to first clamp arm 334, and the positions of pins 342a, 342b, may be adjusted such that skate clamp bar 332 engages butt end 22a of pipe 22 (see FIG. 13D) when pipe 22 is being removed from the work floor of the drilling rig at a relatively shallow angle, as described below.

Figure 14A:
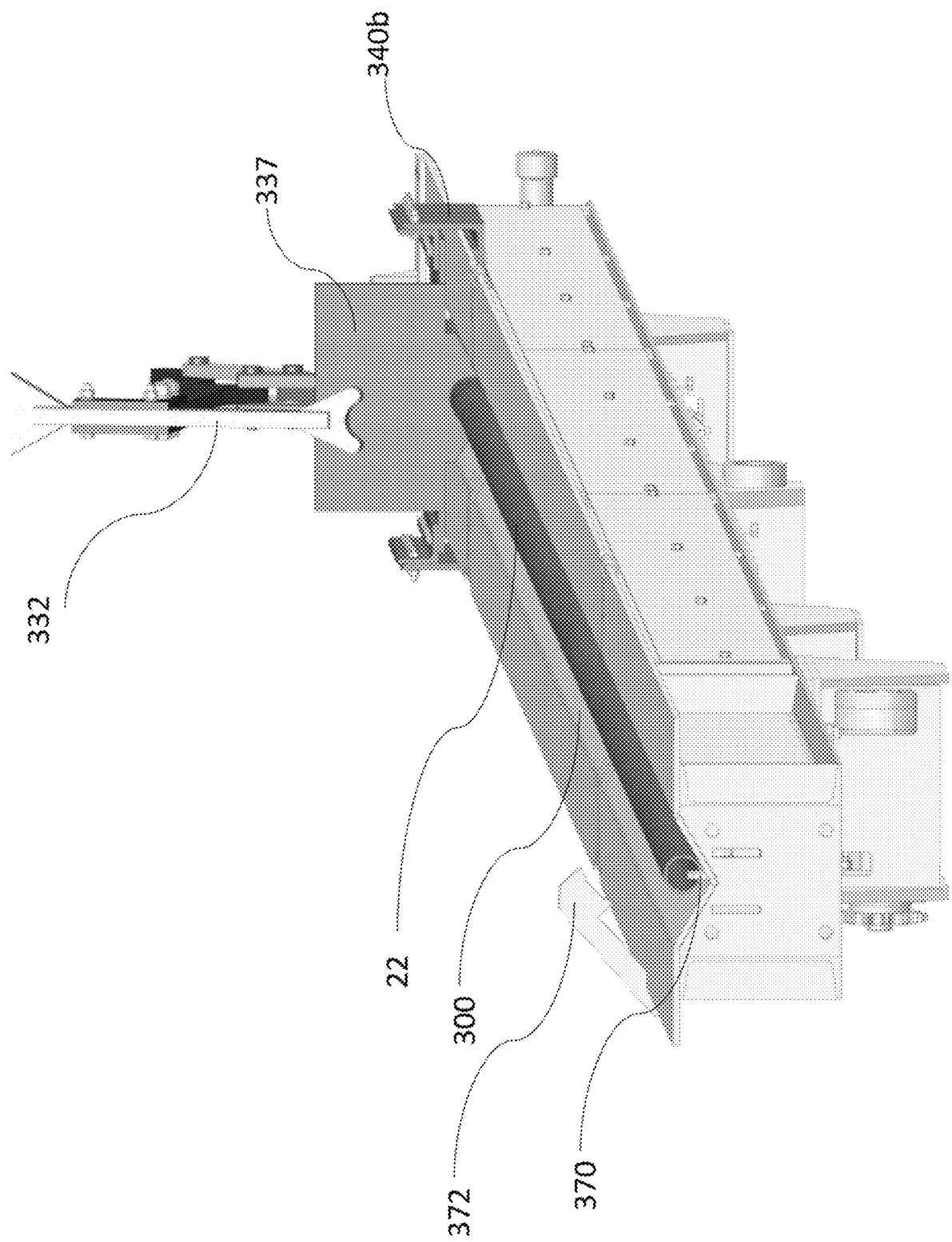
FIG. 14A depicts a perspective view of a pipe disposed between a skate assembly and a pop-up stop on a V-trough as described herein.
Figure 14B:
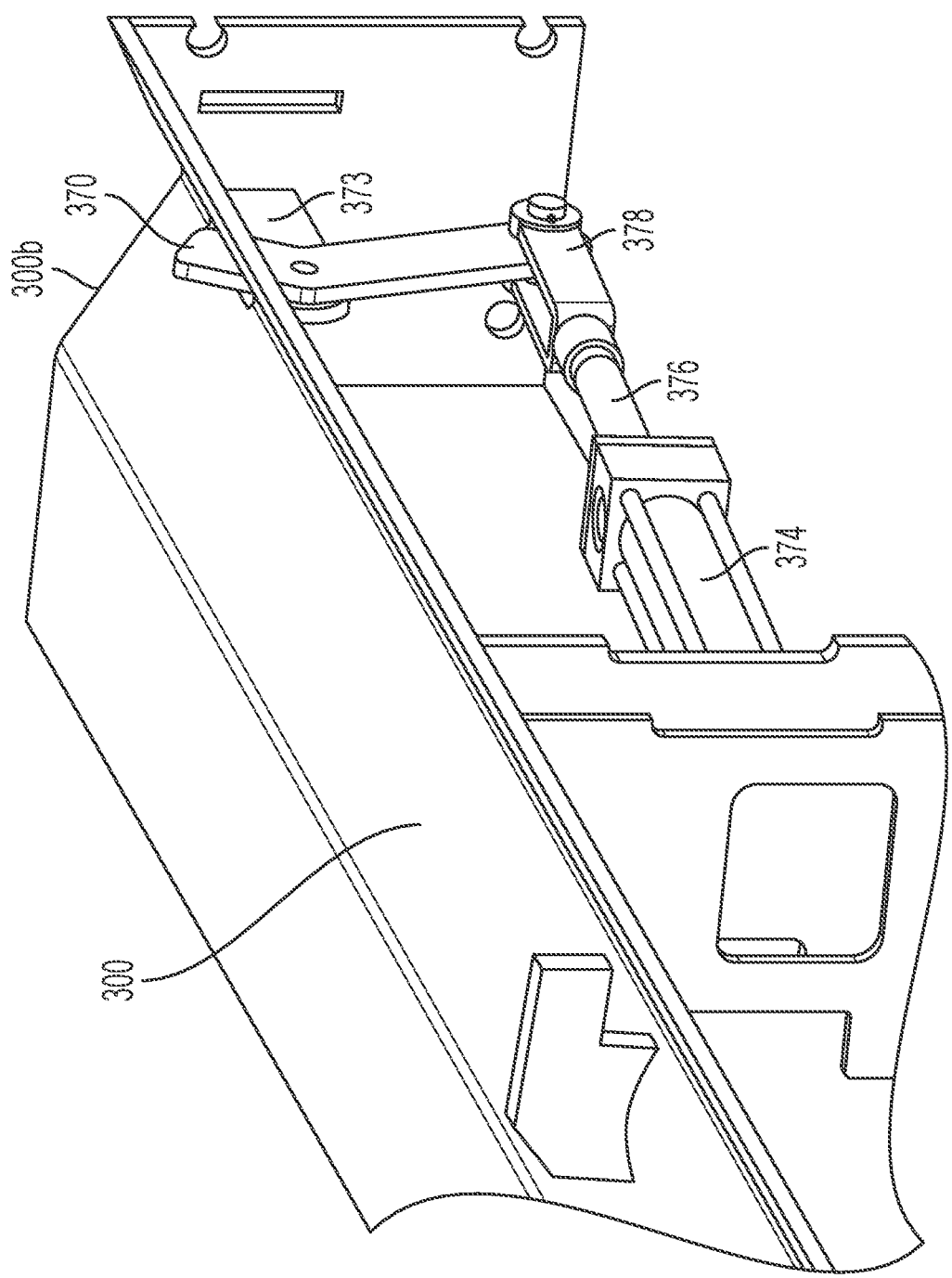
FIG. 14B depicts a cut away view of a portion of the V-trough showing an actuation mechanism for a pop-up stop.

Referring to FIGS. 14A-14B, V-trough 300 may include pop-up stop 370 and pipe clamp 372 located near end 300b of V-trough 300 closest to the drilling rig. Pop-up stop 370 may be pivotally mounted intermediate its ends to flange 373 located beneath the surface of V-trough 300. Pop-up stop 370 may protrude through a slot in the top surface of V-trough 300 when actuated by a piston 374 and piston rod 376, which may be pivotally attached to pop-up stop 370 through a yoke 378 at the end of pop-up stop 370 opposite V-trough 300. As skate assembly pushes pipe 22 toward end 300b of V-trough 300 nearest the drilling rig, pop-up stop 370 may be moved to its raised position such that the end of pipe 22 opposite push plate 337 abuts against pop-up stop 370. The position of skate assembly 330 at the point where pipe 22 abuts pop-up stop 370 may be measured using a rotary encoder or like sensor (not shown) associated with drive pulley 352 or idler pulley 353 and capable of measuring the rotation of drive pulley 352 or idler pulley 353. Information from the rotary encoder may be transmitted to the control system to confirm the length of pipe 22 in V-trough 300 before the pipe is transferred to the drilling rig, as described below.

Figure 15B:
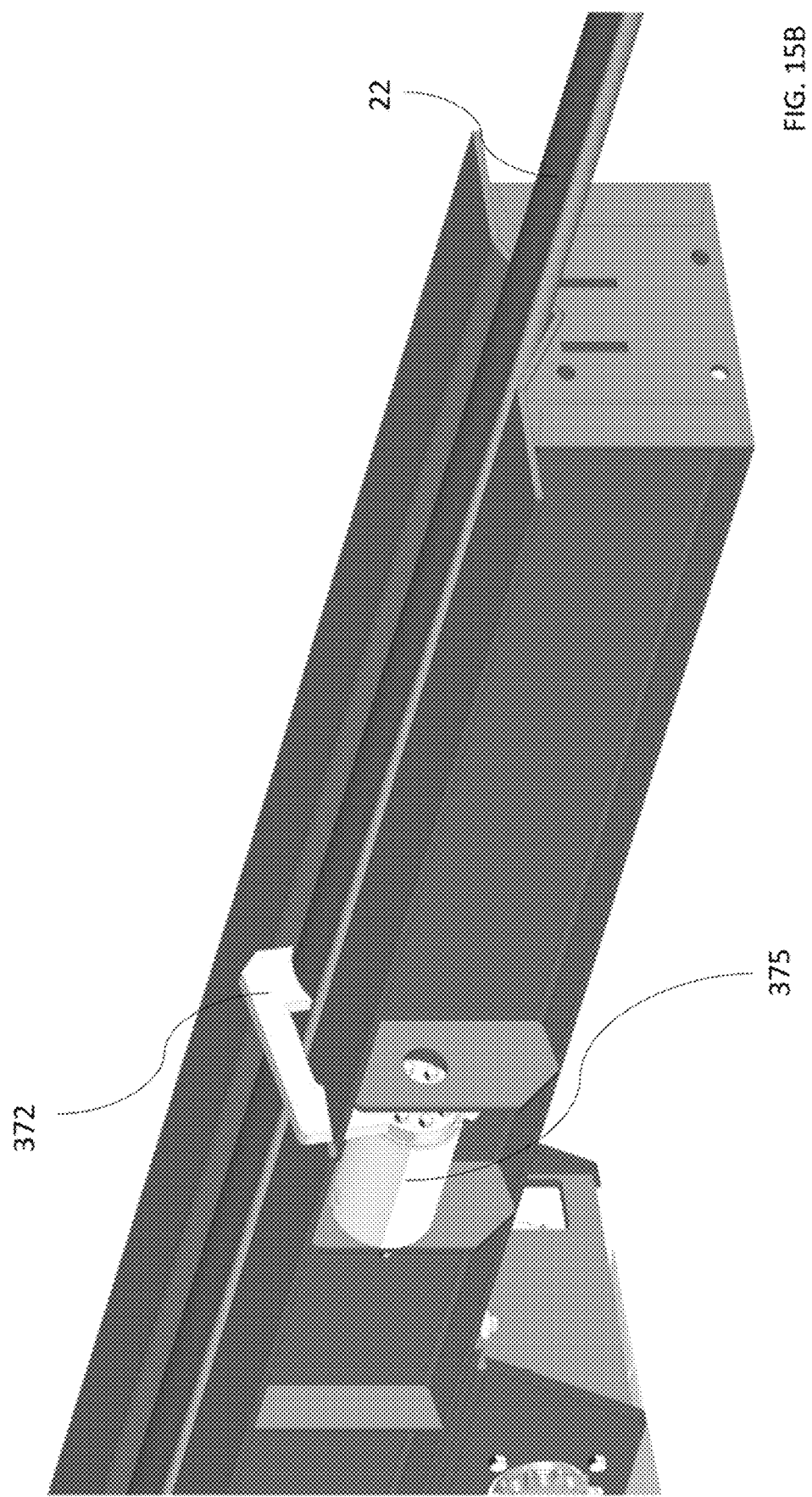
FIG. 15B depicts a perspective view of the V-trough in an extended position showing a pipe clamp engaging a pipe thereon.

Referring to FIGS. 15A-15B, pipe clamp 372 may be lowered by clamp motor 375 to engage pipe 22 resting on V-trough 300 after pipe 22 has been raised to a position where it is ready to be transferred to the drilling rig floor. The engagement of pipe clamp 372 with pipe 22 allows a power swivel (not shown) to be coupled to pipe 22 by rotating the swivel relative to pipe 22 and engaging with the threads on the pipe. After the power swivel has been coupled to pipe 22, pipe clamp 372 may be raised to a position where it no longer engages pipe 22. Pipe 22 may then be lifted by power swivel from V-trough 300 to the drilling rig floor.

A power swivel may also be used to lower pipe 22 from the drilling rig floor to V-trough 300 of pipe handling trailer 105. In this operation, pipe 22 is placed onto V-trough 300 and abuts push plate 337. Pipe clamp 372 may be lowered into engagement with pipe 22 to enable the power swivel to be de-coupled from pipe 22 by rotating the swivel in a direction to unthread the swivel from the pipe.

Transferring Pipe from Tubs to Pipe Handling Trailer

Figure 16:
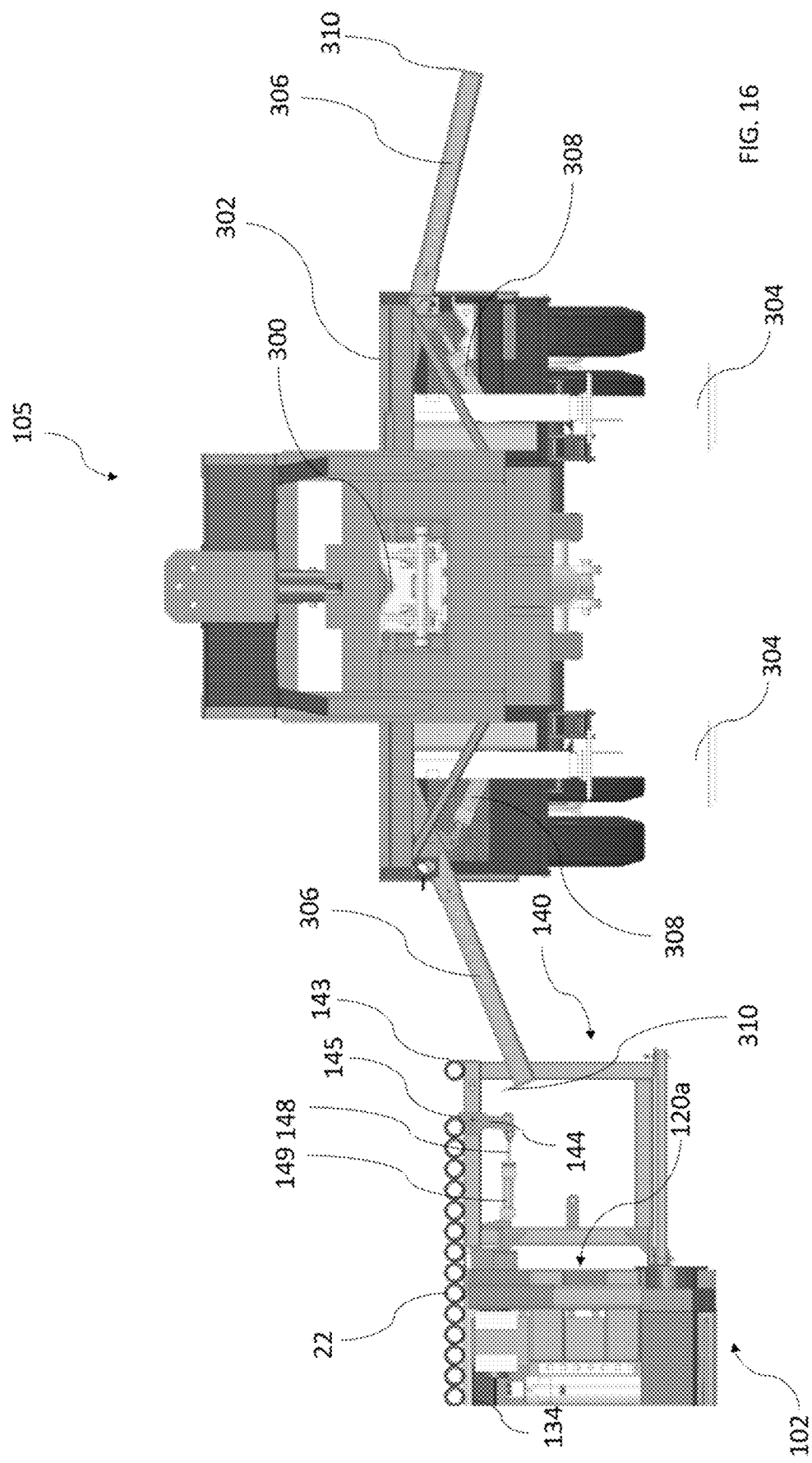

Referring to FIG. 16, pipe 22 may be transferred to pipe handling trailer 105 using pipe indexer assembly 140. Pipes 22 may roll from crossover racks 134 installed on tub 102 closest to pipe handling trailer 105 or from raised lift arms 150 within tub 102 closest to pipe handling trailer 105 onto top frame member 141a of pipe indexer assembly 140 and come to rest against projection 145. Piston 149 may be actuated by a motor (not shown) to cause indexing plate 144 to rotate clockwise as viewed in FIG. 16 through the action of piston rod 148. This rotation lowers projection 145 below the surface of top frame member 141a to allow a single pipe 22 closest to pipe handling trailer 105 to roll toward and come to rest against stop plate 143. Picker arm 306 may be rotated by the action of piston 308 to pick up pipe 22 and lift it such that pipe 22 rolls from picker arm 306 into V-shaped trough 300.

Pipes 22 may be off-loaded from tubs 102 in any order desired. The order chosen may depend on the identity or quantity of pipe contained in the tubs or the order in which the tubs have been delivered to the well site and arranged near pipe handling trailer 105. FIG. 11 illustrates an example in which pipes 22 have been emptied from the tub farthest from pipe handling trailer 105. To off-load pipe from a particular tub, which may be designated the active tub, crossover racks 134 are first removed from the active tub. The operator will ensure that crossover racks 134 remain installed on any tubs between the active tub and pipe handling trailer 105 and that drop-in racks 135 are installed between the active tub and all tubs between the active tub and the pipe handling trailer (see FIGS. 26-27) and also that pipe indexing assemblies 140 are installed to create a smooth path for pipes to roll toward pipe handling trailer 105. Lift arms 150 within the active tub may be raised such that the top row of pipe is raised above top surface of top frame member 121 of tub side frame member 120b such that pipe 22 is able to roll over separator 170, drop-in racks 135 and crossover racks 134 installed on tubs between the active tub and pipe handling trailer until pipe 22 reaches pipe indexing assembly 140 as shown in FIG. 16. If any tub between the active tub and pipe handling trailer 105 is empty of pipe, crossover racks 134 may be reinstalled onto the empty tub to create a rolling path for pipe 22. Alternatively, lift arms 150 of the empty tub may be raised such that the top surface of raising arm 156 is generally flush with top surface of top frame member 121 to allow pipe 22 to roll over the empty tub by rolling over raising arm 156.

Once the top row of pipe has been off-loaded from the active tub, sensors located in the tub or on drop-in racks 135 or on pipe indexer assembly 140 may sense that pipe has been off-loaded and the next row is ready to be off-loaded. The operator will manually remove spacer 170 to expose the next row of pipe in the active tub. Lift arms 150 are raised to a position that allows the next row of pipe to roll toward pipe handling trailer 105 as just described. When all rows of pipe have been off-loaded from the active tub, tub sensor will indicate that the tub is empty of pipe.

Figure 17:
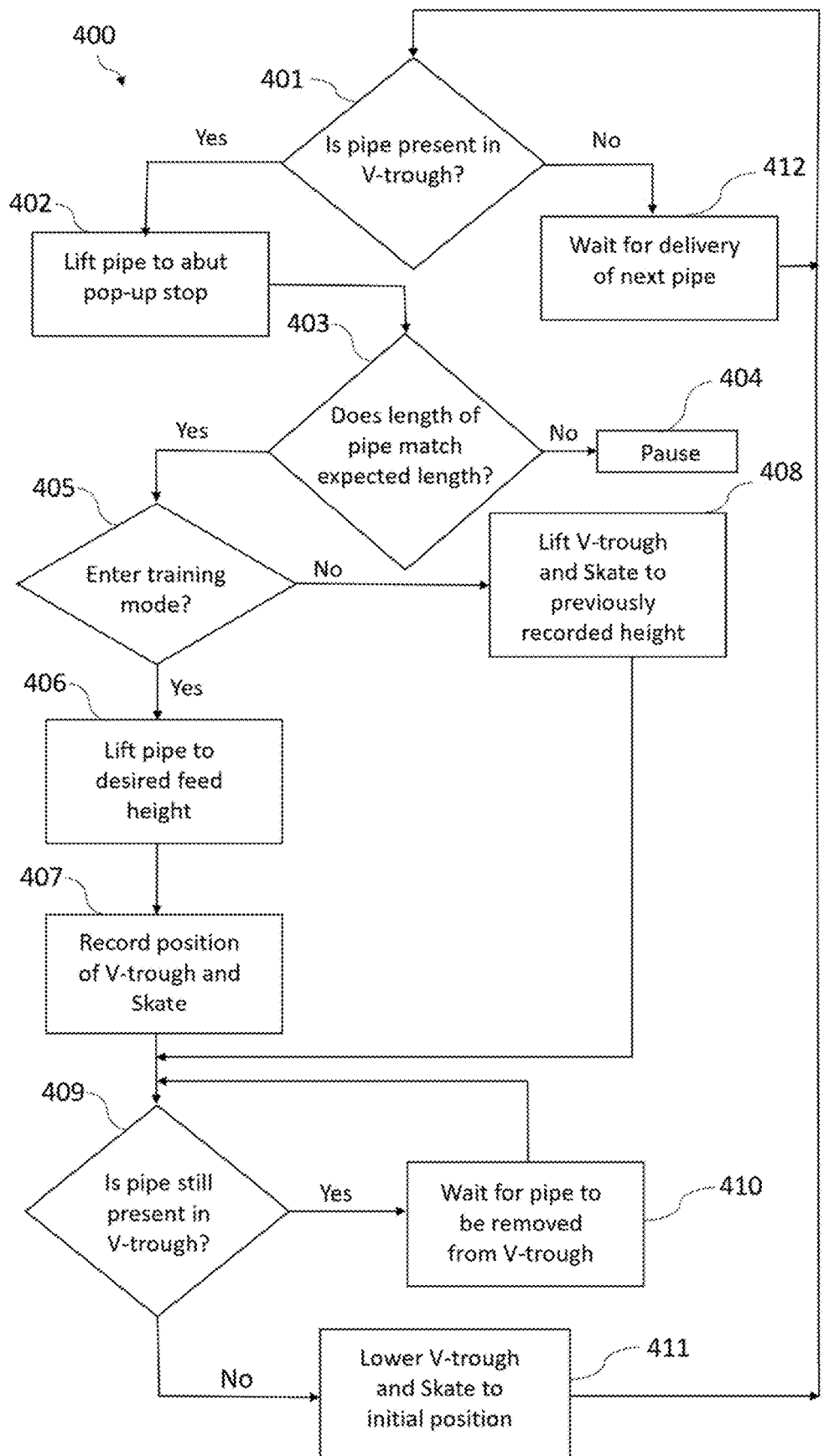
Figure 22:
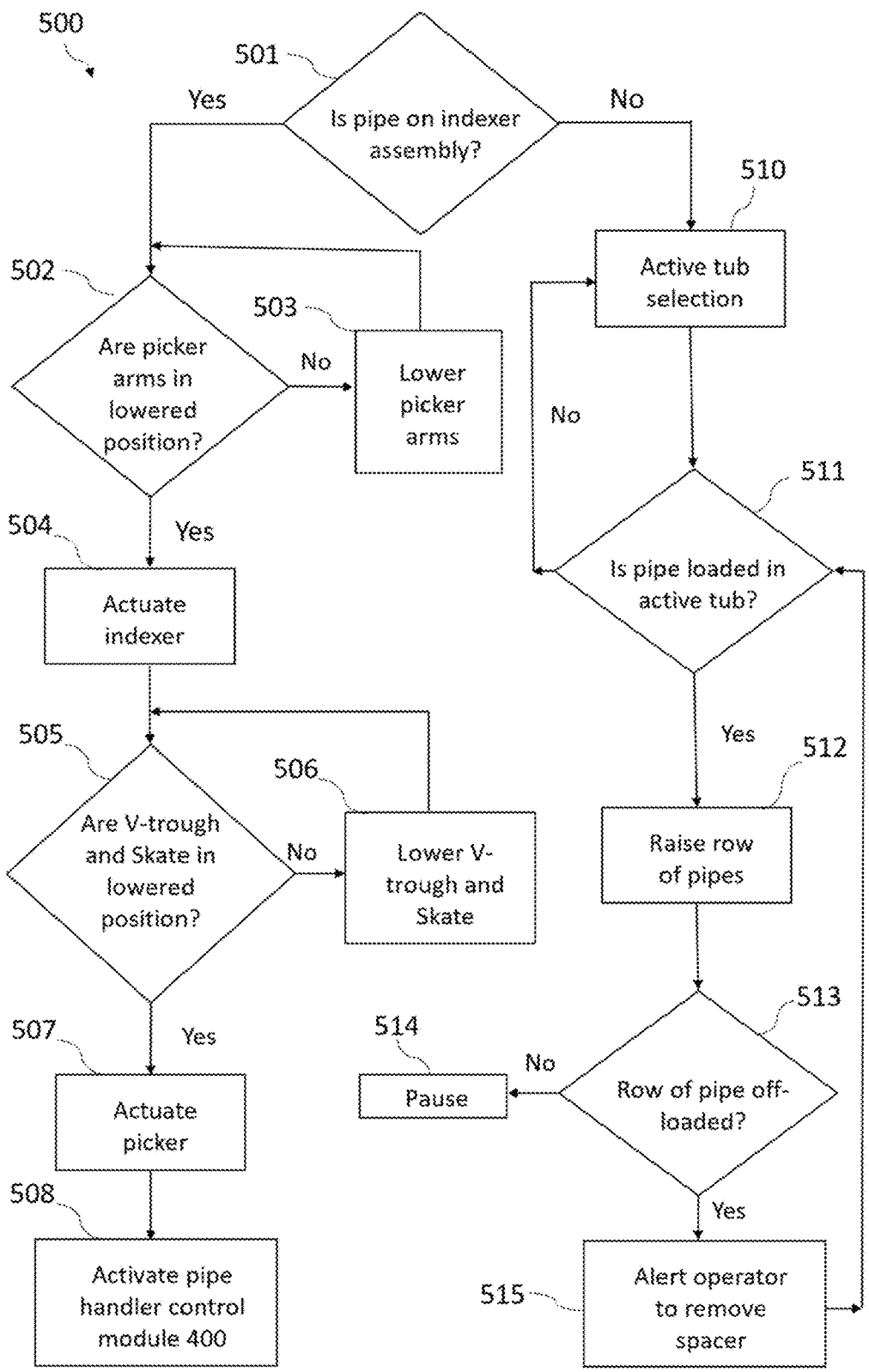

The unloading of pipe 22 from tubs 102 may be controlled manually by an operator using controls operable to actuate lift arms 150 and pipe indexer assembly 140 on tubs 102 and pickers arms 306, V-trough 300 and skate assembly 330 on pipe handling trailer 105. Alternatively, referring to FIG. 22, the unloading of pipes 22 from tubs 102 may be automatically controlled by tub control module 500 in an automatic mode. A sensor on pipe indexer assembly 140 may sense whether a pipe is present on the indexer abutting projection 145 (see FIG. 14) at step 501. If a pipe is present, a sensor on pipe handling trailer 105 senses whether picker arms 306 on the side of the trailer facing the tub are in the lowered position at step 502. If the picker arms 306 are not in the lowered position, they are lowered by pistons 308 at step 503. When the picker arms 306 are sensed to be in their lowered position, piston 149 actuates indexing plate 144 through piston rod 148 to rotate plate 144 to lower projection 145 to allow one pipe 22 to roll toward stop projection 143 (see FIG. 14) at step 504. Angular sensor associated with V-trough 300 and rotary encoder associated with skate assembly 330 sense whether V-trough 300 and skate assembly 330 are in their lowered position at step 505. If not, V-trough 300 and skate assembly 330 are positioned in their lowered position through activation of the V-trough hydraulic piston 320 and skate drive motor pulley 352 at step 506. Once V-trough 300 and skate assembly 330 are in their lowered position, picker arms 306 may be actuated by pistons 308 to lift a single pipe 22 that has rolled against stop plate 143 from top surface 141a of pipe indexing assembly 140 at step 507. Picker arms 306 may then be raised to an angle such that pipe rolls from picker arms 306, over trailer bed 302 and into V-trough 300. At step 508, pipe handler control module 400 may be activated to deliver pipe 22 to the drilling rig as described in connection with FIG. 17.

If no pipe is sensed to be present on pipe indexer assembly 140 at step 501, pipe must be delivered to pipe indexer assembly 140 from a tub. If not already previously selected, the operator may select which tub is the active tub from which pipe will be off-loaded at step 510. Selection of which tub to be the active tub may be influenced by the information about pipes 22 previously stored when the tubs were loaded. For example, if the stored information indicates that the tub farthest from pipe handling trailer 105 contains drill pipe joints of a size suitable for use in the drill string that drills the initial well bore, that tub may be selected as the active tub.

At step 511, the sensor associated with the active tub may sense whether pipe is loaded in the active tub. If no pipe is present in the active tub, the operator may be prompted to select a different active tub. At step 512, if pipe is present in the active tub, a row of pipes is raised so as to clear the top surface of top frame member 121 of tub side frame member 120b as previously described. At step 513, the sensor associated with the active tub or alternatively a sensor on drop-in rack 135 on the active tub senses whether the row of pipe has been off-loaded. If not, automatic operation may be paused to enable to operator to investigate whether a fault has occurred at step 514. If the row of pipe has been successfully off-loaded, the operator is alerted to remove spacer 170 over the next row of pipe at step 515. Automatic operation may then resume at step 511.

Transferring Pipe to Drilling Rig Floor

V-trough 300 contains magnetic sensors (not shown) for sensing the presence of pipe 22 in the trough. In addition, drive pulley 352 or idler pulley 353 may include a rotary encoder or like sensor (not shown) capable of measuring the pulley rotation as previously described. Skate chain 350 may further include metal plate 358 that interacts with one or more additional magnetic sensors (not shown) that are positioned along V-trough 300 to measure the position of skate assembly 330 along V-trough 300.

The operation of pipe handling trailer 105 may be controlled manually by an operator using controls operable to actuate V-trough 300, skate assembly 330, pop-up stop 370 and pipe clamp 372. Alternatively, referring to FIG. 17, pipe handler control module 400 may control the operation of pipe handling trailer 105 in an automatic mode to deliver pipe to the drilling rig floor. At step 401, the presence of pipe 22 in V-trough 300 is first sensed by magnetic sensors associated with V-trough 300. If no pipe is present, the system is paused at step 412 until a pipe is delivered to V-trough 300. If pipe is present, at step 402, skate drive motor pulley 352 and pop-up drive piston 374 are actuated to push pipe against pop-up stop 370. To shorten the time for a pipe lifting cycle, the movement of the pipe against pop-up stop 370 may take place simultaneously with lifting of V-trough 300 by hydraulic piston 320. At step 403, a determination is made by the control module whether the pipe in V-trough 300 matches the expected length of the pipe based on the information about the pipe previously recorded in memory. If the lengths do not match, the system pauses to enable operator intervention at step 404. If the lengths match, a decision is made whether to enter a training mode to train the system to remember the desired feed height for delivering pipe 22 to drilling rig platform 15 at step 405.

In a training mode, when the first pipe 22 is delivered to the drilling rig floor, the position of V-trough 300 and skate assembly 330 may be recorded and saved to enable further automatic operation. In training mode, at step 406, V-trough 300 may be raised to an angle relative to trailer bed 302 to a sufficient height to allow delivery of pipe 22 to the drilling rig floor. The angle of V-trough 300 may be sensed by an angular sensor located at end 300a of V-trough assembly 300 to measure the angle of inclination of V-trough assembly 300 relative to trailer bed 302. Skate drive motor pulley 352 may be actuated to drive skate assembly 330 toward end 300b of V-trough 300 closest to the drilling rig such that pipe 22 is supported by extension 315 in a feed position. V-trough 300 and skate assembly 330 may be moved simultaneously to shorten the time needed to carry out the necessary movements. Push plate 337 abuts end 22a of pipe 22 and pushes pipe 22 up V-trough 300 to the desired feed height from which pipe 22 may be removed from V-trough by equipment on the drilling rig. If pipe 22 is removed using a power swivel, pipe clamp 372 may be actuated to allow the power swivel to engage pipe 22 as previously described. The position of skate assembly 330 at the desired feed height may be sensed by rotary encoder or like sensor associated with drive pulley 352 or idler pulley 353 or by sensing the presence of metal plate 358 on skate drive chain 350 by a magnetic sensor associated with V-trough 300. The sensed position of V-trough 300 and skate assembly 330 may be recorded in memory associated with pipe handler control module 400 at step 407. At steps 409 and 410, the V-trough sensors are monitored until it is determined that pipe 22 has been removed from V-trough 300 and lifted to the drilling rig floor. At step 411, V-trough 300 and skate assembly 330 are returned to their initial position where they are ready to receive and deliver the next pipe 22.

Pipe handling trailer 105 may thereafter be operated in an automatic mode in which V-trough 300 is lifted to the previously recorded height and skate assembly 330 is driven to its previously recorded position such that subsequent pipes are delivered to the drilling rig floor at the same feed height as the first pipe. V-trough 300 and skate assembly 330 may move simultaneously to economize on the time needed to carry out the required movements. Once the presence of pipe 22 in V-trough 300 is sensed in step 401 and it is determined that the pipe is of the expected length in step 403, automatic mode may be selected. V-trough 300 and skate assembly 330 are actuated to raise pipe 22 to the previously recorded feed height in step 408. The movement of skate assembly 330 in step 408 may also be adjusted based on the previously stored information about the pipe. For example, if a pipe of a different length than had been used in training steps 405-407 is present in V-trough 300, the extent of movement of skate assembly 330 may be adjusted to account for the length difference in step 408 without entering training mode. Once it has been sensed that pipe 22 has been removed from V-trough 300 at step 409, V-trough 300 and skate assembly 330 are lowered to their initial position in step 411 to receive the next pipe.

Removing Pipe from Drilling Rig Floor

Figure 18:
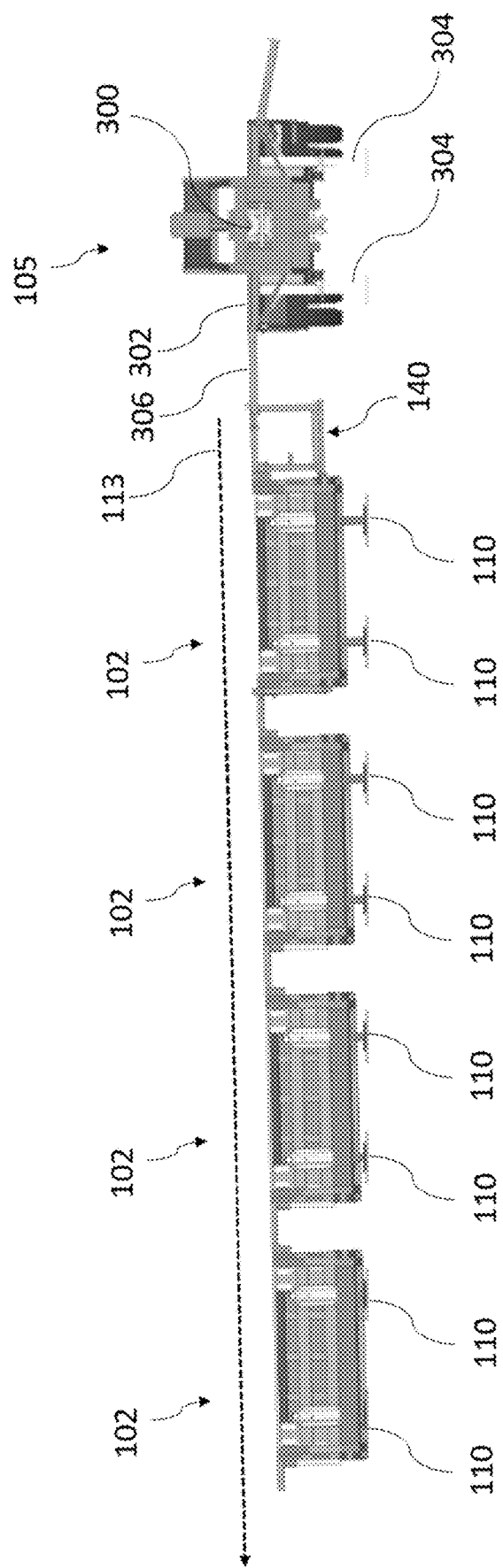

Pipe 22 may be removed from the drilling rig floor, for example, when the drill string has been tripped out of the well and it is desired to remove the drill pipe joints from the drilling rig floor and return them to tubs 102. Referring to FIG. 18, adjustable feet 110 of tubs 102 may be adjusted such that tubs 102 are angled at a slight incline, for example about 1.5°, away from pipe handler trailer 105. Where multiple tubs are deployed, the feet on each tub may be adjusted to the correct height so that a substantially smooth, inclined slope is formed substantially in a plane 113 parallel to the tops of each tub as shown in FIG. 18. Plane 113 is angled at a slight incline, for example, 1.5°, away from pipe handler trailer 105 to allow pipes to roll from pipe handling trailer 105 toward tubs 102. Adjustable landing gear 304 of pipe handling trailer 105 may also be adjusted so that pipe handling trailer 105 is above the level of tubs 102 and inclined at a slight angle toward tubs 102 such that pipe 22 may roll from V-trough 300 over trailer bed 302 and toward tubs 102 as described below.

Figure 13D:
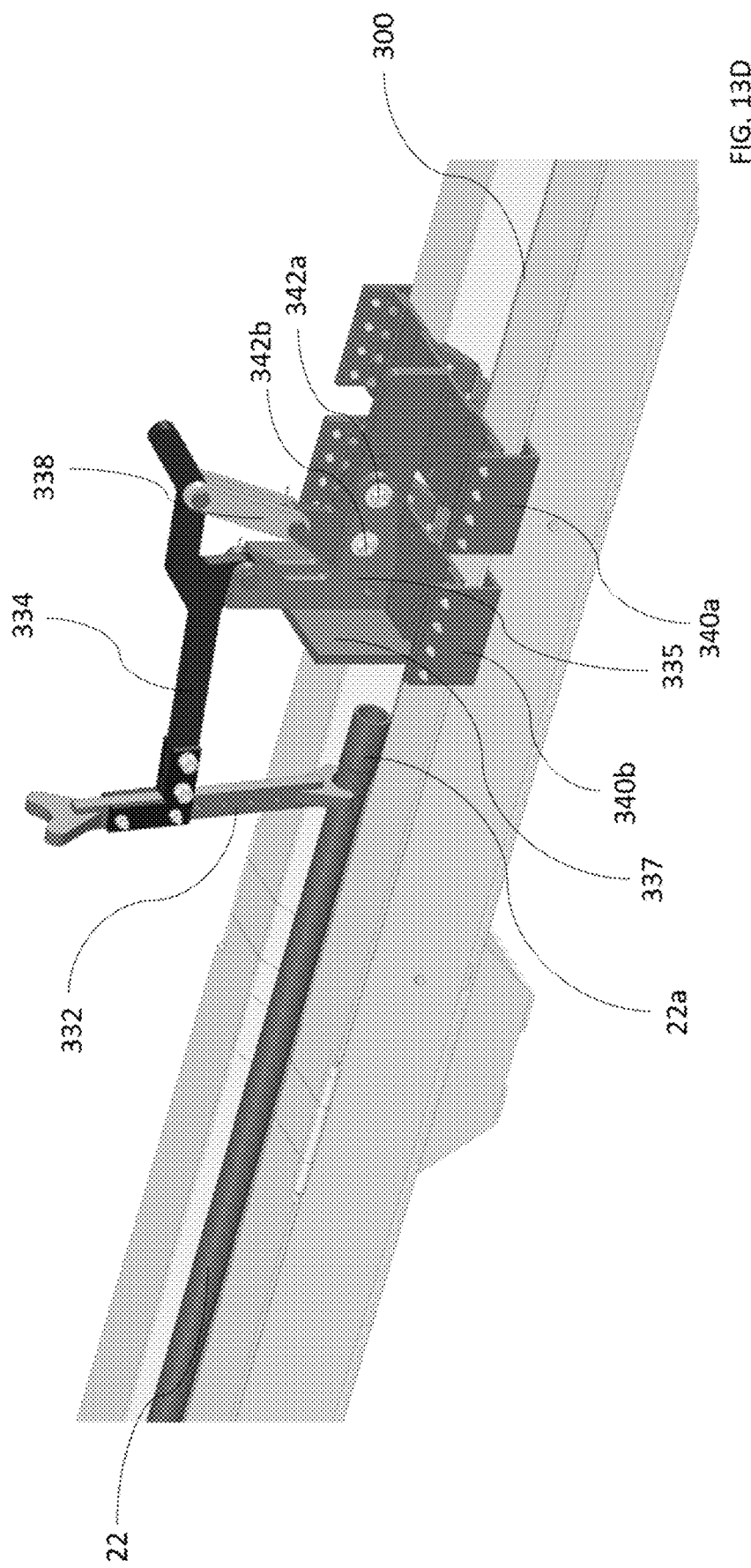
FIG. 13D depicts a perspective view of a skate assembly with a clamp arm in a raised position engaging a pipe as described herein.
Figure 13E:
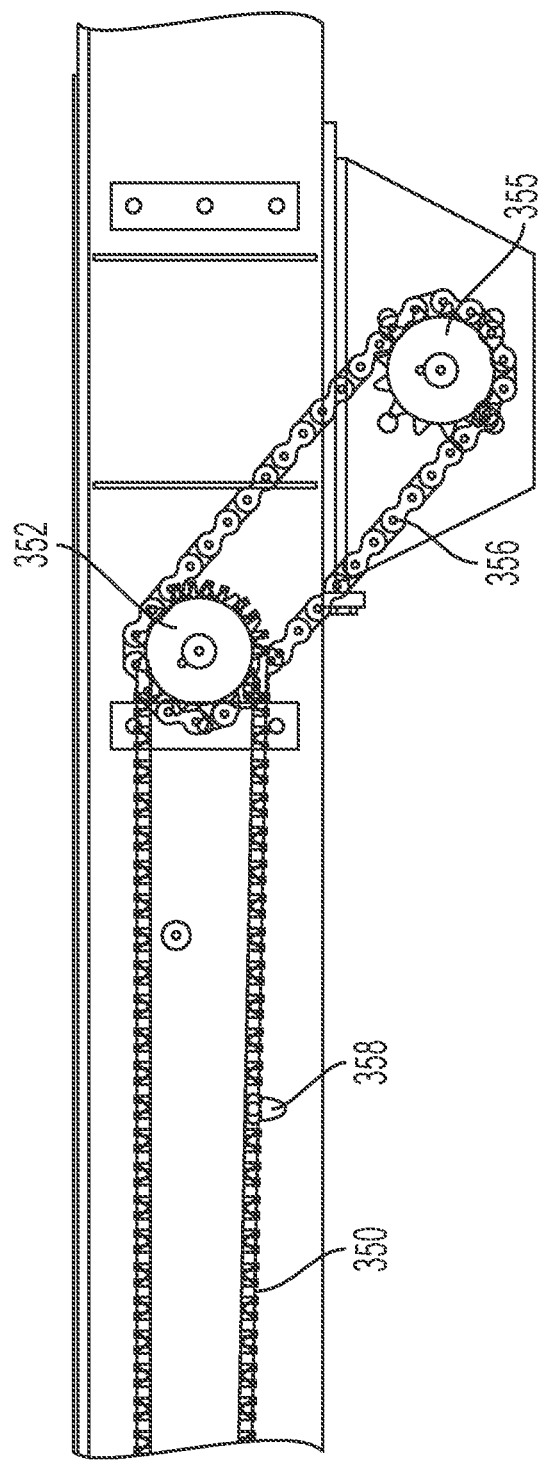
FIG. 13E depicts a cross sectional view of a skate drive mechanism as described herein.

To receive pipe 22 from the drilling rig floor, skate assembly is moved to a position near end 300b of V-trough closest to the drilling rig and V-trough 300 is lifted to a feed height suitable for receiving pipe in the trough. Pipe 22 may be placed in V-trough 300 and supported by extension 315 using the pipe manipulating apparatus on the drilling rig. Where a power swivel is used to lower pipe 22 onto V-trough 300, pipe clamp 372 may be lowered to engage pipe to allow de-coupling of the power swivel as previously described. Where the drilling rig floor is at a relatively large height relative to the height of trailer bed 302, for example ten feet or more, pipe 22 placed into V-trough 300 from the drilling rig floor may slide into contact with push plate 337 of skate assembly 330 by the force of gravity. Skate clamp bar 332 engages pipe 22 as skate assembly is driven toward end 300a of V-trough 300 away from the drilling rig as previously explained. Skate clamp bar 332 operates to prevent pipe 22 from being dislodged from V-trough 300 as it is lowered toward trailer bed 302.

Where the height difference between the drilling rig floor and the level of trailer bed 302 is not as large, for example, on the order of five feet, the angle of V-trough 300 when raised to its pipe receiving position may not be sufficient to cause pipe 22 to slide into contact with push plate 337 under the force of gravity. In such a case, skate clamp bar 332 operates not only to secure pipe 22 in V-trough 300, but also to pull pipe 22 toward end 300a of V-trough 300 as shown in FIG. 13D. This operation of skate clamp bar 332 therefore avoids the wasteful and time-consuming step of raising V-trough 300 to a greater height after receiving pipe 22 in order to cause pipe 22 to slide into contact with push plate 337 under the force of gravity before lowering V-trough 300 to the level of trailer bed 302.

Figure 19:
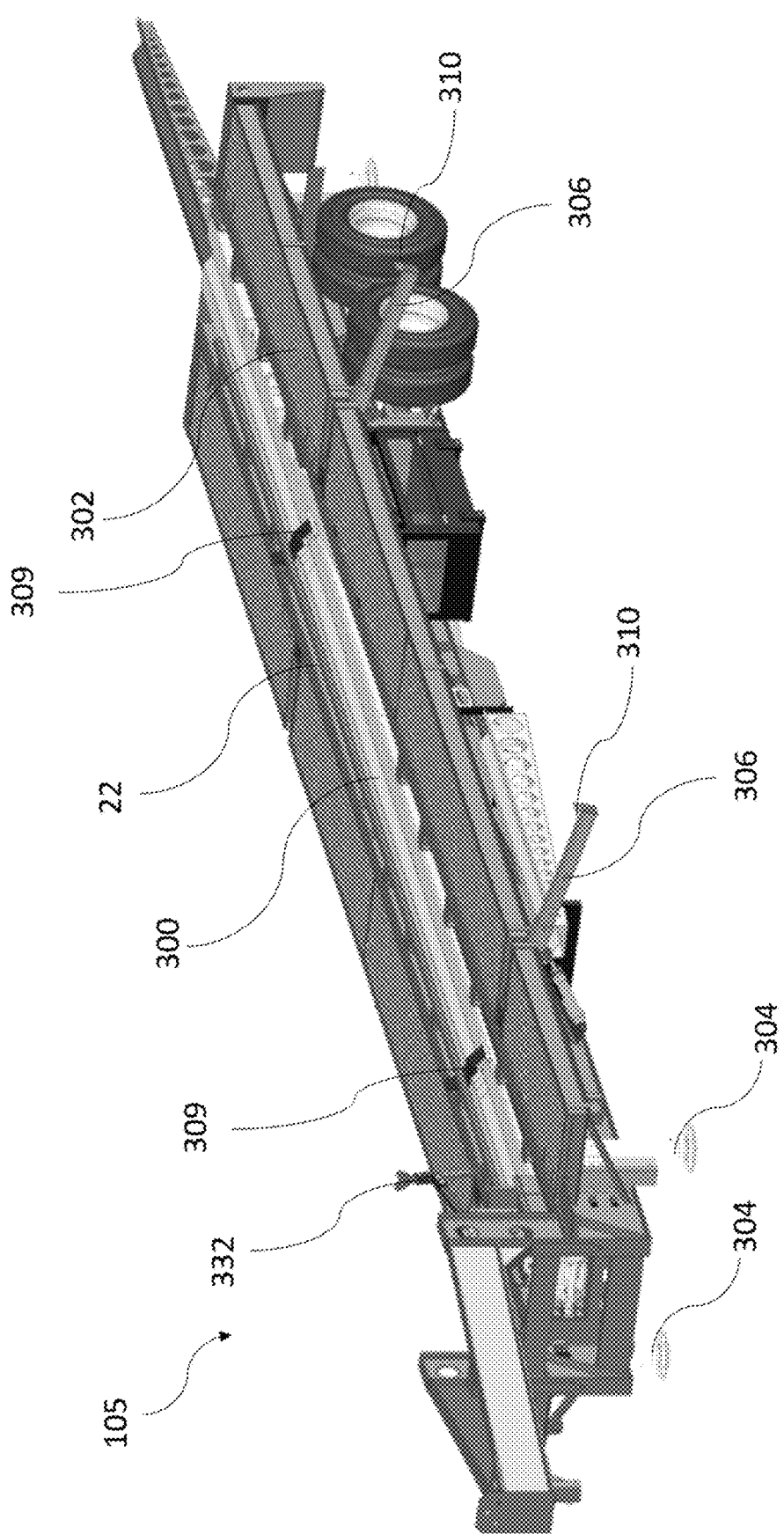
Figure 20:
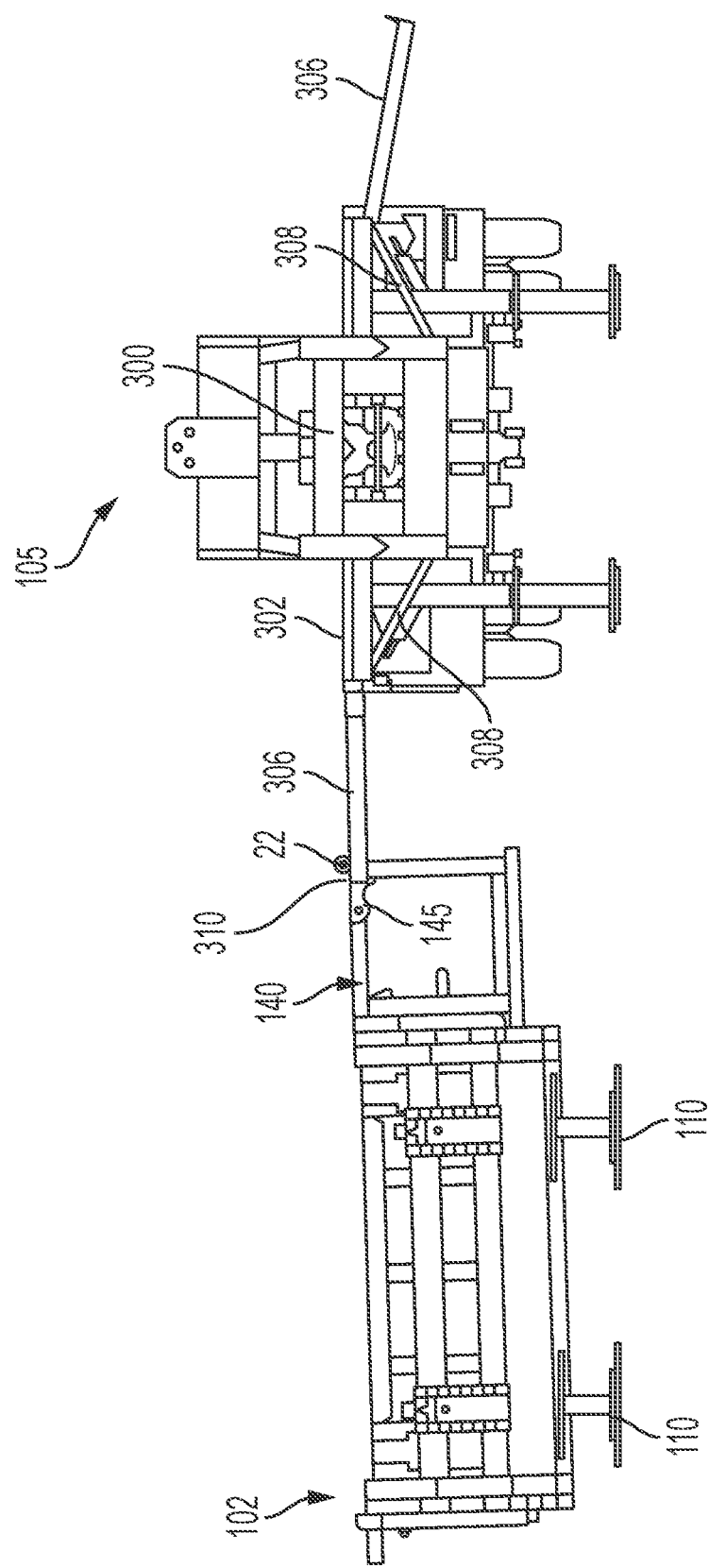
Figure 21:
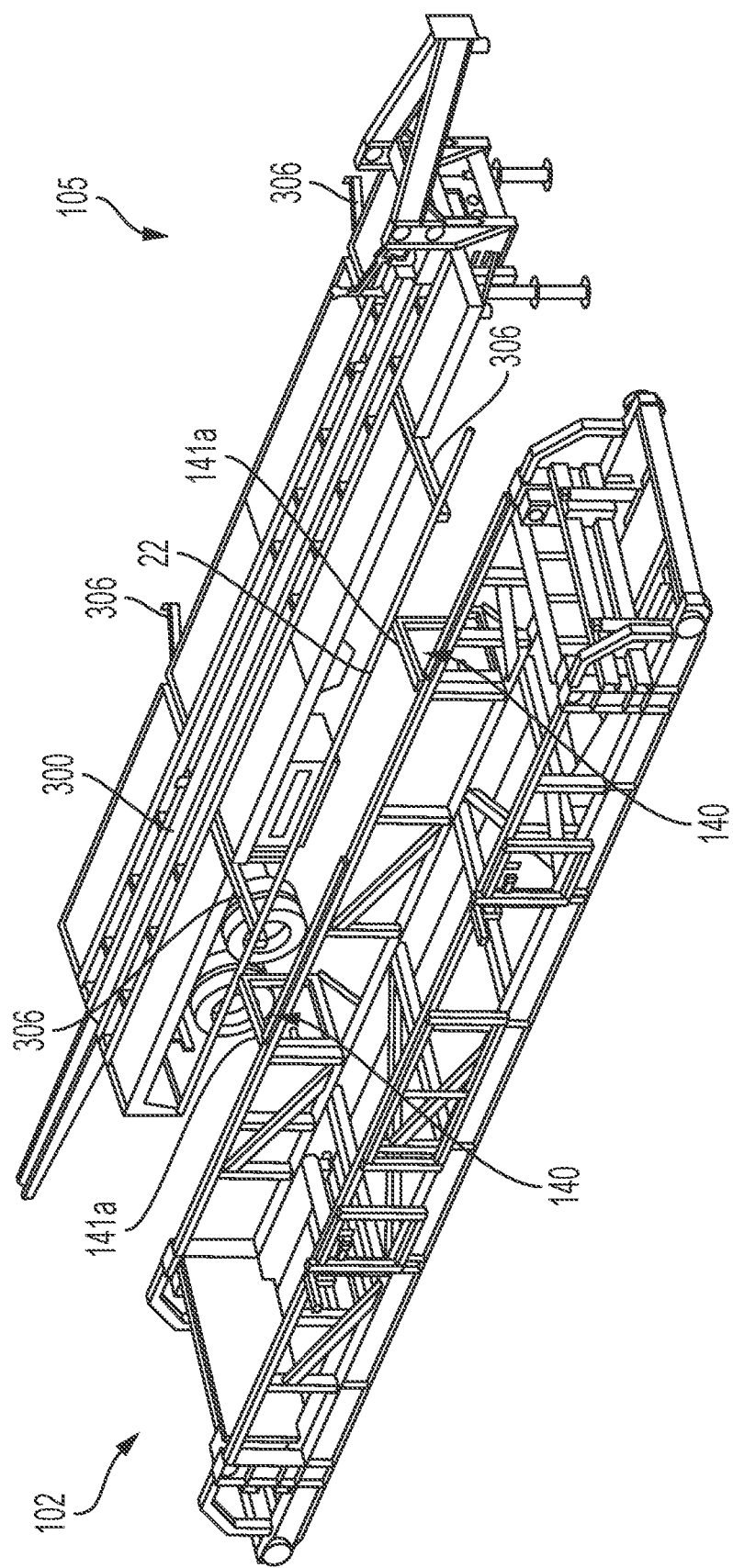

Referring to FIG. 19, pipe handling trailer 105 includes pipe kickers 309 pivotally mounted within V-trough 300. After V-trough 300 is returned to its initial position level with trailer bed 302, pipe kickers 309 may operate to lift pipe 22 from V-trough 300 and cause pipe 22 to roll over trailer bed 302 and onto picker arm 306 due to the incline of pipe handling trailer 105. Pipe 22 is retained on picker arm 306 by raised stop portion 310. Picker arm 306 then may be further lowered such that pipe 22 contacts the top surface of top frame member 141a of pipe indexer assembly 140 (see FIG. 21). As picker arm 306 is lowered further, pipe 22 is released from picker arm 306 and rests on top surface of top frame member 141a of pipe indexer assembly 140. Piston 149 may then be actuated to rotate indexing plate 144 to lower projection 145 to allow pipe 22 to roll toward tub 102. Projection 145 may remain in the lowered position throughout the tub re-loading process. Pipe 22 may roll directly into the tub closest to pipe handling trailer 105 or may roll over crossover racks 134 and drop-in racks 135, or alternatively roll over raised lift arms 150 of an empty intervening tub, into a tub farther from pipe handling trailer 105.

Figure 23:
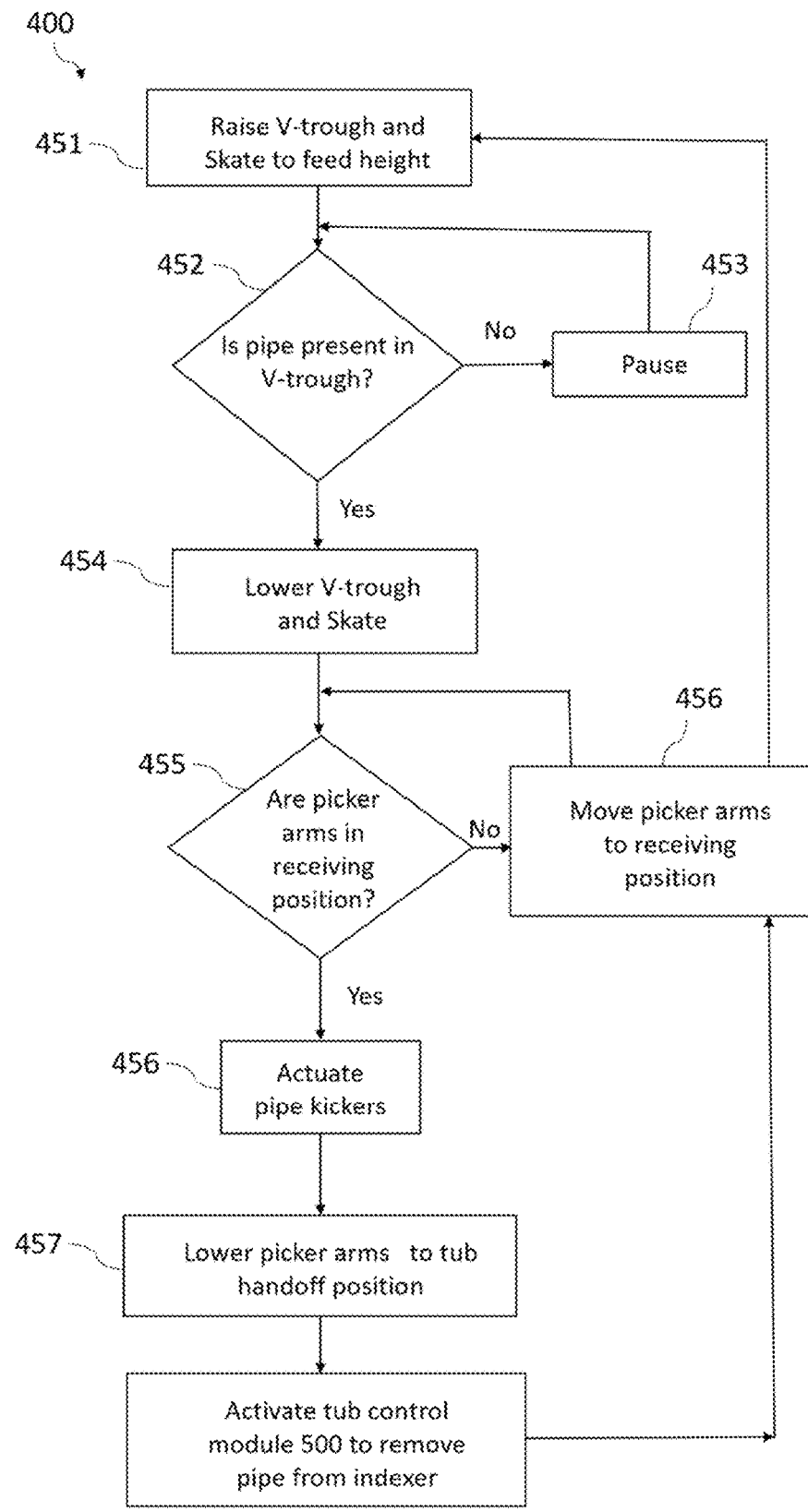

The process of transferring pipe back to tubs 102 may be controlled manually by an operator using controls to actuate V-trough 300, skate assembly 330, pipe kickers 309 and picker arms 306 of pipe handling trailer 105. Alternatively, referring to FIG. 23, pipe handler control module 400 may control the operation of pipe handling trailer 105 in an automatic mode to remove pipe from the drilling rig floor. V-trough 300 and skate assembly 330 are raised to the desired feed height at step 451. The movement of V-trough 300 and skate assembly 330 may take place simultaneously to economize on the time necessary to complete the movement. The height of V-trough 300 and skate assembly 330 may be the previously recorded feed height established in training mode steps 405-407 when pipe was delivered to the drilling rig (see FIG. 17) or a new pipe feed height may be recorded in a similar manner to that described above in connection with FIG. 17. At step 452, sensors in V-trough 300 determine whether a pipe is present. If no pipe is detected, automatic operation is paused at step 453. If a pipe is detected at step 452, V-trough 300 and skate assembly 330 are lowered in step 454 to their initial position level with trailer bed 302 and where pipe kickers 309 may eject the pipe from the V-trough as described above. At step 455, sensors associated with picker arms 306 detect whether picker arms are in their receiving position, in which the ends of picker arms are located below the level of trailer bed 302 to allow pipe ejected by pipe kickers 309 to roll onto picker arms 306 and come to rest at stop 310. If picker arms are not in their receiving position, they are moved to that position in step 456.

Figure 24:
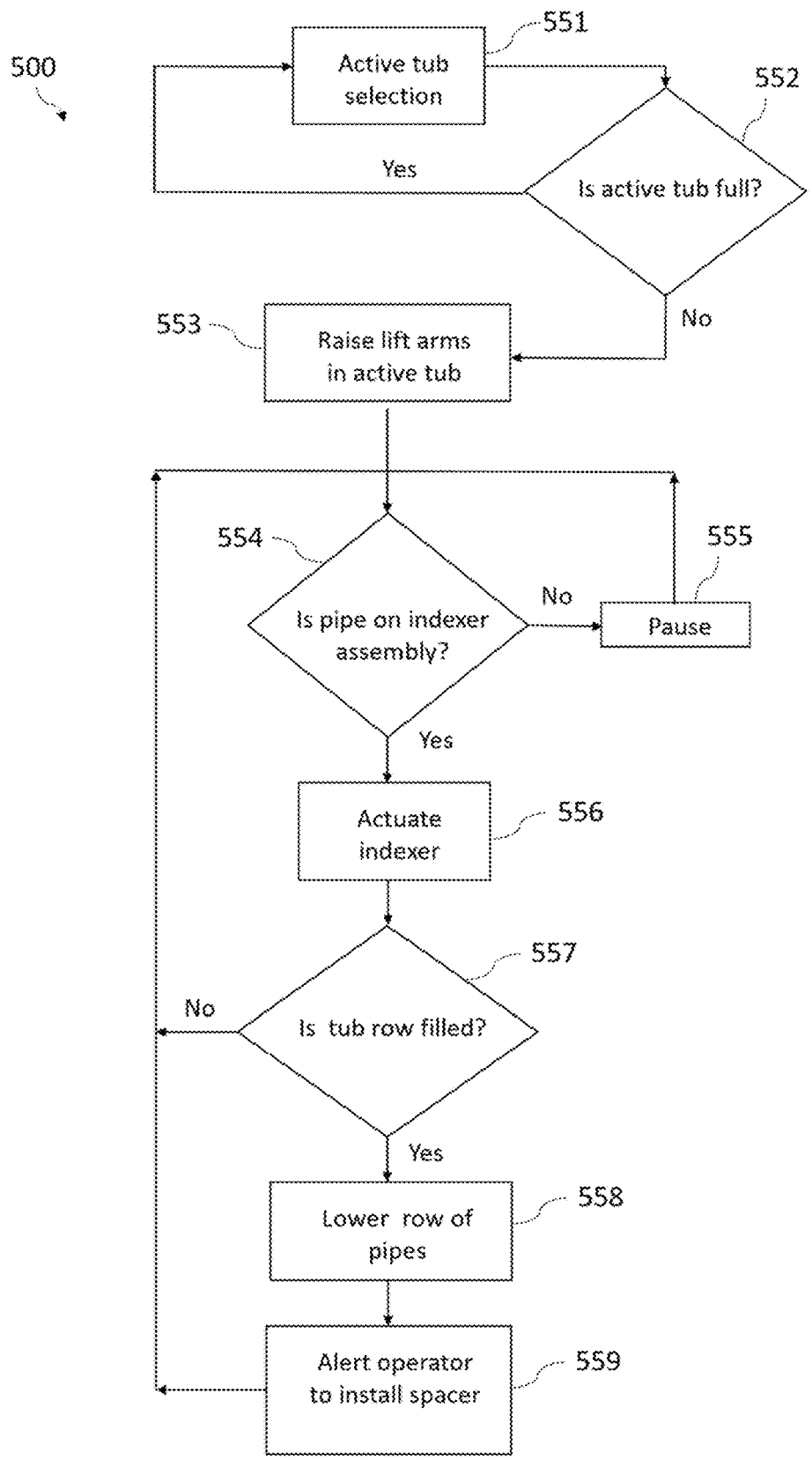

After picker arms 306 are determined to be in their receiving position at step 455, pipe kickers 309 are actuated in step 457 to eject pipe 22 from V-trough 300 and caused to roll over trailer bed 302 and onto picker arms 306. Picker arms 306 are thereafter lowered further to a handoff position where pipe 22 is laid on top of top frame member 141a of pipe indexer assembly 140 and picker arms are no longer in contact with pipe 22. Tub control module 500 is activated at step 458 to actuate indexer assembly 140 as described below in connection with FIG. 24. Thereafter, picker arms 306 are returned to their receiving position and V-trough 300 and skate assembly 330 are raised to the feed height to receive the next pipe.

Tubs 102 may be operated manually during the tub re-loading process by an operator using controls to actuate lift arms 150 and pipe indexer 140. Alternatively, referring to FIG. 24, tub control module 500 may operate in an automatic mode to load pipe back into tubs 102 after they have been removed from the drilling rig as just described. At step 551, the active tub into which the pipe will be loaded may be selected. The sensor associated with the selected tub may detect whether the selected tub is full at step 552. If the selected tub is full, a new active tub must be selected. The active tub may be closest to pipe handling trailer 105 or there may be tubs in between the active tub and pipe handling trailer 105. In the latter case, crossover racks 134 are installed on the intermediate tubs and drop-in racks 135 are installed between tubs to allow pipe to roll over the intermediate tubs and into the active tub. Alternatively, lift arms 150 in an empty intervening tub may be raised such that pipes can roll over raising arms 156 rather than using crossover racks. At step 553, lift arms 150 in the active tub may be been raised such that raising arms 156 are at a level slightly below the top surface of top side frame member 121 to allow pipe to roll into tub and onto raising arms 156.

At step 554, the sensor on pipe indexer assembly 140 may sense whether a pipe 22 is present on pipe indexer assembly 140. If no pipe is present, the automatic mode is paused until a pipe is sensed at step 555. If a pipe is present on the indexer assembly, piston 149 may be actuated at step 556 to rotate indexing plate 144 to lower projection 145 to allow pipe 22 to roll toward the active tub. Projection 145 may remain in the lowered position for the remainder of the rub re-loading process to allow pipes subsequently removed from pipe handling trailer 105 to roll into the active tub or, alternatively, projection 145 may be raised and lowered as each pipe is removed from the pipe handling trailer. At step 557, the sensor associated with the active tub senses whether a row in the active tub has been completely filled. Alternatively, whether a row has been filled may be determined by counts made by sensors in drop-in racks 135 or on pipe indexer assembly 140. If a row has not been filled, steps 554-556 are repeated until a row is filled. Once a row has been filled, lift arms 150 are lowered at step 558 to lower the row of pipe. The operator is then alerted at step 559 to install spacers 170 over the row of pipe. Thereafter, automatic operation may resume at step 154.

Integrated Control System

Figure 25:
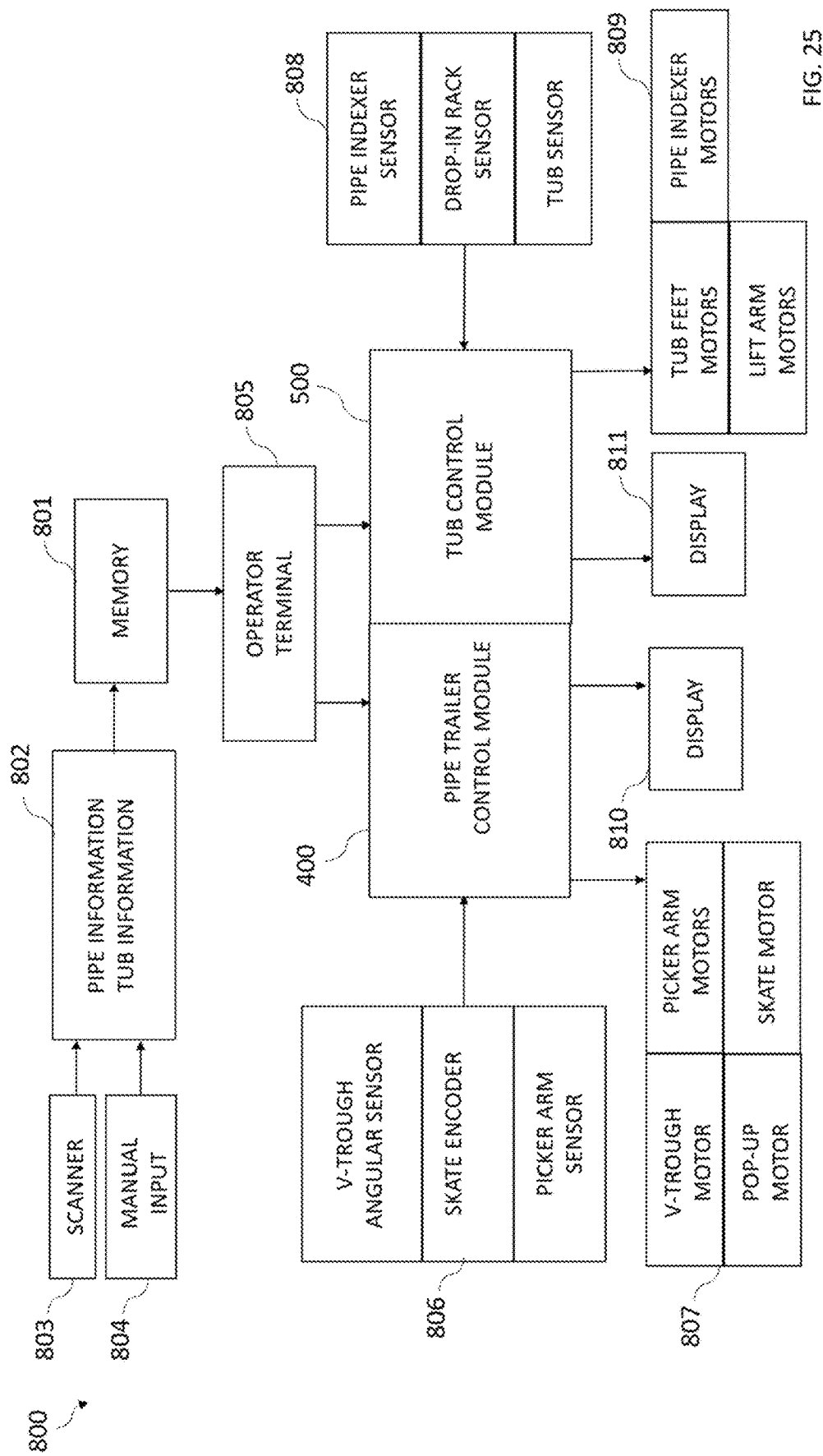

Referring to FIG. 25, integrated control system 800 may include tub pipe handling trailer control module 400 and tub control module 500. Memory 801 may receive information 802 about pipes 22 and tubs 102. Information 802 may include the unique identification of each pipe, the type, height, diameter and weight of each pipe, and the order in which the pipes were loaded into the tubs. Information 802 may also include the unique identification of the tubs correlated to the information about the pipes contained in each tub, as previously described. Information 802 may be collected by a scanning device 803 or input manually 804 into a terminal, tablet or smartphone as previously described. Memory 801 may be any standard storage device such as a disk drive, FLASH drive, USB drive, cloud storage or other device suitable for receiving information 801 from scanner 803 or manual input 804. An operator may use a terminal 805, such as a personal computer, laptop, tablet device, smartphone or other device that contains a processor for executing software instructions and that is capable of communicating with memory 801 and displaying information about pipes 22 and tubs 102 to the operator and capable of communicating command and other information signals to and from modules 400, 500.

Operator terminal 805 communicates with pipe handling trailer control module 400 and tub control module 500 to control the automatic operation of pipe handling trailer 105 and tubs 102 as previously described. For example, an operator may use information 801 to use terminal 805 to select the active tubs to off-load, and the order in which the tubs are off-loaded, based on the identification, type or size of the pipes contained in the tubs. An operator may also use terminal 805 to initiate, pause or terminate the automatic operation of pipe handling trailer 105 or tubs 102 as previously described. Pipe handling trailer control module 400 and tub control module 500 may be a computing device mounted on pipe handling trailer 105 or tub 102, respectively, such as a tablet, terminal or other specialized computing device capable of executing software instructions and communicating with operator terminal 805, receiving inputs 806 and 808, respectively, as described below, and outputting signals to devices 807 and 809, respectively, as described below. Modules 400, 500 may also each include a display 810, 811 to convey information to an operator such as information 801 about pipes or tubs and/or the status of pipe handling trailer 105 or tub 102 such as an indication of whether a tub is the active tub, the position or status of feet 110 and lift arms 150 of tub 102, the position or status of V-trough 300, skate assembly 330, pop-up stop 370, picker arms 306, pipe kickers 309 or pipe clamp 372.

In addition to receiving input from operator terminal 805, pipe handling trailer control module 400 may receive input 806 from the angular sensor associated with V-trough 300, the rotary encoder associated with skate assembly 330 and sensors associated with picker arms 306. Pipe handling trailer control module 400 may activate devices 807 on the pipe handling trailer including V-trough hydraulic cylinder 320, skate drive motor activating skate drive pulley 352, pop-up stop piston 374, pipe clamp motor 375, and picker arm hydraulic cylinders 308. In addition to receiving input from operator terminal 805, tub control module 500 may receive input 808 from sensors associated with pipe indexer assembly 140, drop-in racks 135 and tubs 102. Tub control module 500 may activate devices 809 including tub feet motors 110, lift arm pistons 165 and pipe indexer pistons 149.

Whereas the preferred embodiments herein have been described as using certain equipment, it is understood that other equivalent mechanical mechanisms may be substituted for the components described herein without departing from the invention. For example, while the preferred embodiments are described as using pistons to effectuate many of the movements of the components, it should be understood that various linear actuators could be used, including hydraulic pistons, pneumatic pistons or other mechanisms useful to impart linear movement. In addition, other actuators, such as rotary actuators, may be used to effect rotational movements of components as described herein.

What is claimed is:

1. An integrated pipe handling system comprising:
    a movable container for storing and transporting cylindrical objects; said movable container comprising a frame having frame members, and a lift arm with a lifting surface within said container capable of supporting said cylindrical objects in a raised position or a lowered position;

a movable platform for receiving a said cylindrical object from said movable container; said movable platform comprising a bed, an angularly movable surface for moving said cylindrical object at an angle with respect to said bed; and a skate slidably movable along said angularly movable surface for supporting said cylindrical object at a plurality of positions along said angularly movable surface;

a control system for controlling the operation of said lift arm of said movable container and said angularly movable surface and said skate of said movable platform; said control system being capable of storing information about said cylindrical objects stored in said movable container, and controlling the operation of said lift arm, said angularly movable surface and said skate;

wherein said movable container further comprises an indexing rack disposed on at least one of said frame members and said movable platform further comprises a picker arm pivotally mounted to said movable platform for manipulating said cylindrical objects; said indexing rack and said picker arm are positioned such that said cylindrical object may be transferred from said indexing rack to said picker arm or from said picker arm to said indexing rack; and wherein said indexing rack comprises a frame that supports cylindrical objects thereon;

said indexing rack frame further comprises a fixed projection and a movable projection, whereby when said movable projection is in a first position, a cylindrical object is prevented from rolling over said indexing rack frame and when said movable projection is in a second position, a cylindrical object to permitted to roll over said indexing rack frame.

2. An integrated pipe handling system comprising:

a movable container for storing and transporting cylindrical objects; said movable container comprising a frame having frame members, and a lift arm with a lifting surface within said container capable of supporting said cylindrical objects in a raised position or a lowered position;

a movable platform for receiving a said cylindrical object from said movable container; said movable platform comprising a bed, an angularly movable surface for moving said cylindrical object at an angle with respect to said bed; and a skate slidably movable along said angularly movable surface for supporting said cylindrical object at a plurality of positions along said angularly movable surface;

a control system for controlling the operation of said lift arm of said movable container and said angularly movable surface and said skate of said movable platform; said control system being capable of storing information about said cylindrical objects stored in said movable container, and controlling the operation of said lift arm, said angularly movable surface and said skate;

wherein said control system causes said angularly movable surface and said skate to move said cylindrical object on said angularly movable surface to a feed position;

said control module records said feed position;

and said control module causes said angularly movable surface and said skate to move said cylindrical object on said angularly movable surface to said recorded feed position during a subsequent operation of said movable platform.

3. The integrated pipe handling system of claim 2, wherein said control system further comprises a memory; and said memory stores information about said cylindrical objects.

4. The integrated pipe handling system of claim 3, wherein said memory further stores information about said movable container.

5. The integrated pipe handling system of claim 4, wherein said information about said movable container is selected from the group consisting of a unique identifier associated with said movable container and information about said cylindrical objects loaded within said container.

6. The integrated pipe handling system of claim 5, wherein said unique identifier associated with said movable container is contained in a bar code or RFID tag.

7. The integrated pipe handling system of claim 3, wherein said information about said cylindrical objects is selected from the group consisting of a unique identifier associated with said cylindrical object, the number, type, length, diameter and weight of said cylindrical objects and the order in which said cylindrical objects were previously loaded into said movable container.

8. The integrated pipe handling system of claim 7, wherein said cylindrical objects are selected from the group consisting of drill pipe joints, well casing joints and well completion tubing.

9. The integrated pipe handling system of claim 7, wherein said unique identifier associated with said cylindrical object is contained in a bar code or RFID tag.

10. The integrated pipe handling system of claim 2, wherein said angularly movable surface further comprises a pipe clamp movable from a raised position to a lowered position in which said pipe clamp is capable of engaging said cylindrical object.

11. The integrated pipe handling system of claim 2, wherein said control system is operated in a manual mode.

12. The integrated pipe handling system of claim 2, wherein said control system is operated in an automatic mode.

13. The integrated pipe handling system of claim 2, wherein said movable container and said movable platform are arranged such that the slope of a plane parallel to the top of said movable container is inclined at an angle with respect to said movable platform.

14. The integrated pipe handling system of claim 2, wherein said slope is approximately 1.5° relative to the ground.

15. The integrated pipe handling system of claim 2, wherein said angularly movable surface comprises a magnetic sensor.

16. An integrated pipe handling system comprising:

a movable container for storing and transporting cylindrical objects; said movable container comprising a frame having frame members, and a lift arm with a lifting surface within said container capable of supporting said cylindrical objects in a raised position or a lowered position;

a movable platform for receiving a said cylindrical object from said movable container; said movable platform comprising a bed, an angularly movable surface for moving said cylindrical object at an angle with respect to said bed; and a skate slidably movable along said angularly movable surface for supporting said cylindrical object at a plurality of positions along said angularly movable surface;

a control system for controlling the operation of said lift arm of said movable container and said angularly movable surface and said skate of said movable platform; said control system being capable of storing information about said cylindrical objects stored in said movable container, and controlling the operation of said lift arm, said angularly movable surface and said skate;

wherein said angularly movable surface further comprises a pop-up stop movable between a lowered position and a raised position, whereby said pop-up stop is capable of contacting an end of said cylindrical object when said pop-up stop is in said raised position; and wherein said control system causes said angularly movable surface and said skate to move a cylindrical object on said angularly movable surface to a position in which said cylindrical object contacts said pop-up stop when said pop-up stop is in said raised position.

17. The integrated pipe handling system of claim 16, wherein information about the length of said cylindrical object on said angularly movable surface is transmitted to said control system when said cylindrical object is in contact with said pop-up stop.

\* \* \* \* \*